(12) United States Patent
Ise et al.

(10) Patent No.: US 10,170,761 B2
(45) Date of Patent: Jan. 1, 2019

(54) ACTIVE MATERIAL, NONAQUEOUS ELECTROLYTE BATTERY, BATTERY PACK AND BATTERY MODULE

(71) Applicant: KABUSHIKI KAISHA TOSHIBA, Minato-ku (JP)

(72) Inventors: Kazuki Ise, Kawasaki (JP); Yasuhiro Harada, Isehara (JP); Norio Takami, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 478 days.

(21) Appl. No.: 15/066,433

(22) Filed: Mar. 10, 2016

(65) Prior Publication Data

US 2016/0276662 A1 Sep. 22, 2016

(30) Foreign Application Priority Data

Mar. 19, 2015 (JP) .................................. 2015-056827

(51) Int. Cl.
*H01M 4/485* (2010.01)
*C01G 33/00* (2006.01)
*H01M 4/62* (2006.01)
*H01M 10/0525* (2010.01)
*H01M 4/131* (2010.01)
(Continued)

(52) U.S. Cl.
CPC ............ *H01M 4/485* (2013.01); *C01G 33/00* (2013.01); *H01M 4/131* (2013.01); *H01M 4/625* (2013.01); *H01M 10/0525* (2013.01); *C01P 2002/54* (2013.01); *C01P 2002/60* (2013.01); *C01P 2002/76* (2013.01); *C01P 2004/03* (2013.01); *C01P 2004/54* (2013.01);
(Continued)

(58) Field of Classification Search
None
See application file for complete search history.

(56) References Cited

U.S. PATENT DOCUMENTS

2014/0295231 A1 10/2014 Ise et al.
2014/0295247 A1 10/2014 Yoshima et al.
2015/0010820 A1 1/2015 Takami et al.

FOREIGN PATENT DOCUMENTS

EP 2 503 625 A2 9/2012
EP 2 784 026 A1 10/2014
(Continued)

OTHER PUBLICATIONS

Extended European Search Report dated Aug. 8, 2016 in Patent Application No. 16158442.0.
(Continued)

*Primary Examiner* — Sarah A. Slifka
(74) *Attorney, Agent, or Firm* — Oblon, McClelland, Maier & Neustadt, L.L.P.

(57) ABSTRACT

In general, according to one embodiment, there is provided an active material. The active material contains active material primary particles of a monoclinic niobium-titanium composite oxide. The monoclinic niobium-titanium composite oxide contains at least one element selected from the group consisting of Mo, V, and W. A content of the at least one element in the monoclinic niobium-titanium composite oxide is within a range of 0.01 atm % or more and 2 atm % or less. Each of the active material primary particles has an aspect ratio within a range of 1 or more and less than 4 of a primary particle and a crystallite size within a range of 5 nm or more and 90 nm or less.

13 Claims, 8 Drawing Sheets

(51) Int. Cl.
  *H01M 4/36* (2006.01)
  *H01M 4/02* (2006.01)
(52) U.S. Cl.
  CPC ...... *H01M 4/366* (2013.01); *H01M 2004/027* (2013.01); *H01M 2220/20* (2013.01)

(56) References Cited

FOREIGN PATENT DOCUMENTS

| FR | 3 001 725 A1 | 8/2014 |
|---|---|---|
| JP | 2010-287496 A | 12/2010 |
| JP | 2013-145759 A | 7/2013 |
| JP | 2014-209445 A | 11/2014 |
| KR | 10-2015-0006384 A | 1/2015 |

OTHER PUBLICATIONS

Jian-Tao Han, et al., "New Anode Framework for Rechargeable Lithium Batteries" Chemistry of Materials, vol. 23, 2011, pp. 2027-2029.

Korean Office Action dated Jul. 31, 2017 in Korean Patent Application No. 10-2016-0028066.

Changshin JO, et al., "Block Copolymer Directed Ordered Mesostructured $TiNb_2O_7$ Multimetallic Oxide Constructed of Nonocrystals as High Power Li-Ion Battery Anodes", Chemistry of Materials, vol. 26, May 8, 2014, pp. 3508-35014.

Hongsen Li, et al., "$TiNb_2O_7$ Nanoparticles assembled into hierarchical microspheres as high-rate capability and long-cycle-life anode materials for lithium ion batteries", Nanoscale, vol. 7, 2015, pp. 619-624.

Hongsen Li, et al., "Electronic Supplementary Information for $TiNb_2O_7$ Nanoparticles assembled into hierarchical microspheres as high-rate capability and long-cycle-life anode materials for lithium ion batteries", Nanoscale, vol. 7, 2015, 8 Pages.

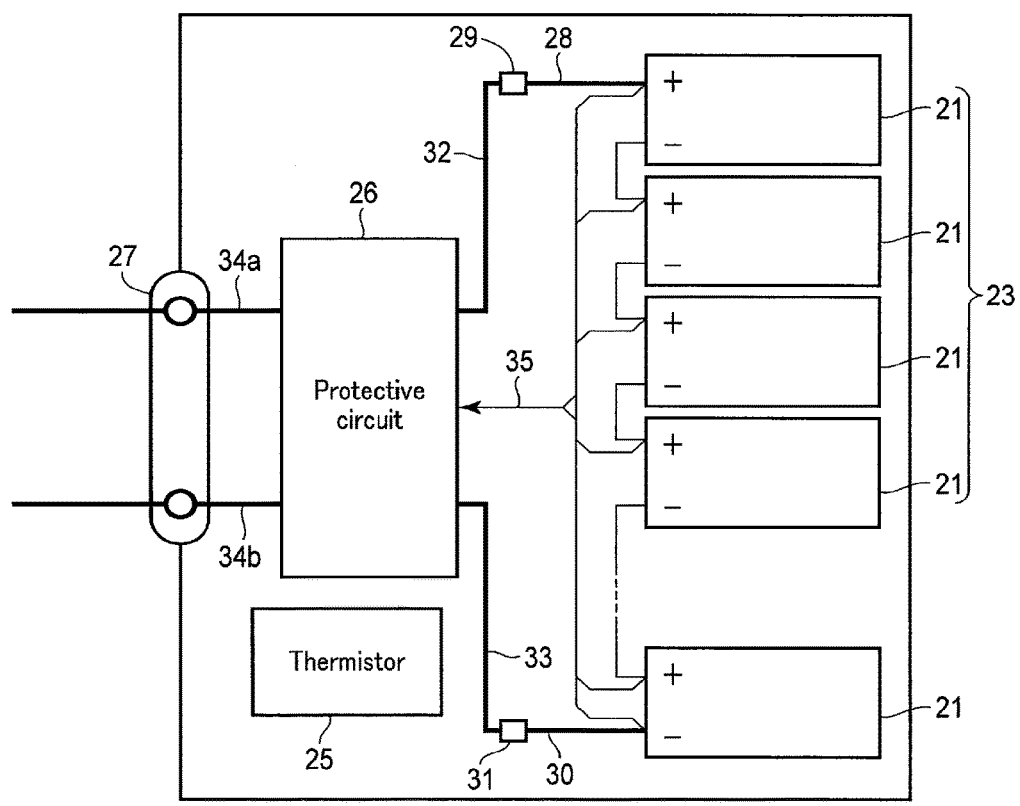
F I G. 8

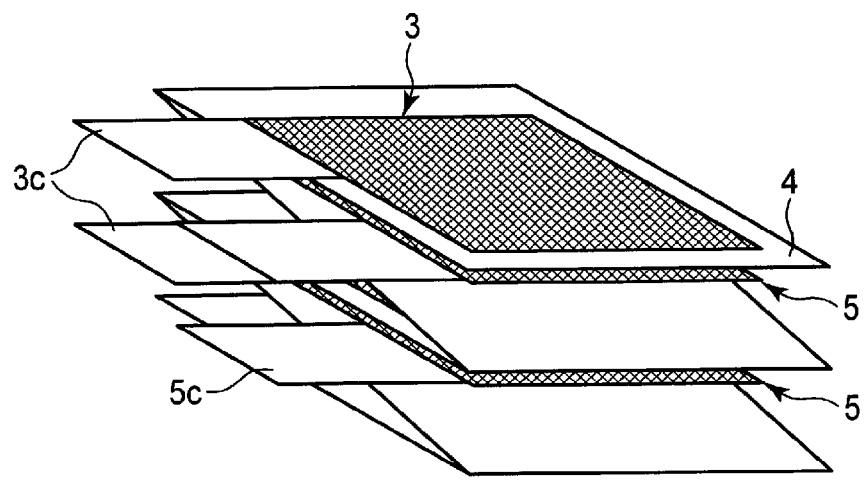
F I G. 13

ACTIVE MATERIAL, NONAQUEOUS ELECTROLYTE BATTERY, BATTERY PACK AND BATTERY MODULE

CROSS-REFERENCE TO RELATED APPLICATIONS

This application is based upon and claims the benefit of priority from the Japanese Patent Application No. 2015-056827, filed Mar. 19, 2015, the entire contents of which are incorporated herein by reference.

FIELD

Embodiments described herein relate generally to an active material for a battery, a nonaqueous electrolyte battery, and a battery pack.

BACKGROUND

Recently, a nonaqueous electrolyte battery such as a lithium-ion secondary battery has been developed as a battery having a high energy density. The nonaqueous electrolyte battery is expected to be used as a power source for vehicles such as hybrid vehicles or electric cars or a large-sized power source for electricity storage. Particularly, for use in vehicles, the nonaqueous electrolyte battery is desired to have other performances such as rapid charge-and-discharge performances and long-term reliability. The nonaqueous electrolyte batteries capable of performing rapid charge-and-discharge have the advantage that a charging time is considerably short. In hybrid vehicles on which the nonaqueous electrolyte batteries capable of performing rapid charge-and-discharge are mounted, power performance can be improved. Moreover, in the hybrid vehicles, regenerative energy can be efficiently recovered the power.

In order to enable rapid charge-and-discharge, it is necessary for electrons and lithium ions to be able to migrate rapidly between the positive electrode and the negative electrode. When a battery using a carbon based material in the negative electrode undergoes repeated rapid charge-and-discharge, dendrite precipitation of metal lithium occurs on the electrode. Dendrites cause internal short circuits, which can lead to heat generation and fires.

In light of this, a battery using a metal composite oxide as a negative electrode active material in place of a carbonaceous material has been developed. Particularly, in a battery using titanium oxide as the negative electrode active material, rapid charge-and-discharge can be performed stably. Such a battery also has a longer life than those using a carbonaceous material.

However, titanium oxide has a higher (nobler) potential relative to metal lithium than that of the carbonaceous material. Further, titanium oxide has a lower capacity per weight. Thus, a battery formed by using the titanium oxide has a problem such that the energy density is low.

For example, the potential of the electrode using titanium oxide is about 1.5 V based on metal lithium and is higher (i.e., nobler) than that of the negative electrode using the carbonaceous material. The potential of titanium oxide is due to the redox reaction between $Ti^{3+}$ and $Ti^{4+}$ when lithium is electrochemically inserted and extracted. Therefore, it is limited electrochemically. Further, there is the fact that rapid charge-and-discharge of lithium ions can be stably performed at an electrode potential as high as about 1.5 V. Therefore, it is substantially difficult to drop the potential of the electrode to improve energy density.

As to the capacity of the battery per unit weight, the theoretical capacity of a lithium-titanium composite oxide such as $Li_4Ti_5O_{12}$ is about 175 mAh/g. On the other hand, the theoretical capacity of a general graphite-based electrode material is 372 mAh/g. Therefore, the capacity density of titanium oxide is significantly lower than that of the carbon-based negative electrode. This is due to a reduction in substantial capacity because there are only a small number of lithium-insertion sites in the crystal structure of titanium oxide and lithium tends to be stabilized in the structure.

In view of such circumstances, a new electrode material containing Ti and Nb has been examined. Particularly, in a monoclinic Nb—Ti composite oxide represented by $TiNb_2O_7$, during the Li-insertion into this composite oxide, charge compensation, in which Ti changes from tetravalence to trivalence and Nb changes pentavalence to trivalence, takes place. As a result, the monoclinic Nb—Ti composite oxide represented by $TiNb_2O_7$ exhibits a theoretical capacity of 387 mAh/g, and can exhibit a high capacity, and thus has been a focus of attention.

BRIEF DESCRIPTION OF THE DRAWINGS

FIG. 8 is a block diagram showing the electric circuit of the battery pack of FIG. 7;

FIG. 13 is a schematic perspective view of an electrode group included in a test battery of Example 1.

DETAILED DESCRIPTION

Figure 1:
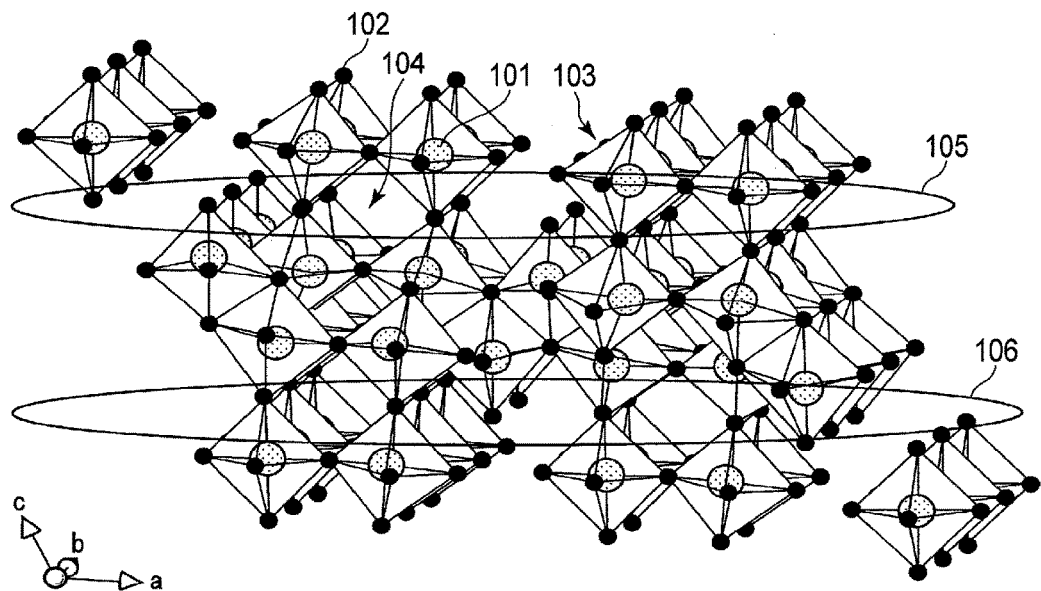
FIG. 1 is a pattern diagram showing a crystal structure of monoclinic $TiNb_2O_7$.

In general, according to one embodiment, there is provided an active material. The active material contains active material primary particles of a monoclinic niobium-titanium composite oxide. The monoclinic niobium-titanium composite oxide contains at least one element selected from the group consisting of Mo, V, and W. A content of the at least one element in the monoclinic niobium-titanium composite oxide is within a range of 0.01 atm % or more and 2 atm % or less. Each of the active material primary particles has an aspect ratio for a primary particle within a range of 1 or more and less than 4. Each of the active material primary particles has a crystallite size within a range of 5 nm or more and 90 nm or less.

The embodiments will be explained below with reference to the drawings. In this case, the structures common to all embodiments are represented by the same symbols and duplicated explanations will be omitted. Also, each drawing is a typical view for explaining the embodiments and for promoting the understanding of the embodiments. Though there are parts different from an actual device in shape, dimension and ratio, these structural designs may be properly changed taking the following explanations and known technologies into consideration.

First Embodiment

According to a first embodiment, there is provided an active material for a battery. The active material for a battery contains active material particles of a monoclinic niobium-titanium composite oxide. The monoclinic niobium-titanium composite oxide contains at least one element selected from the group consisting of Mo, V, and W. A content of the at least one element selected from the group consisting of Mo, V, and W in the monoclinic niobium-titanium composite oxide is within a range of 0.01 atm % or more and 2 atm % or less. Each of the active material particles has an aspect ratio for a primary particle within a range of 1 or more and less than 4. Each of the active material particles has a crystallite size within a range of 5 nm or more and 90 nm or less.

A niobium-titanium composite oxide is a composite oxide having a crystal structure referred to as a Wadthley-Roth phase and containing a niobium element and a titanium element. In this composite oxide, octahedrons, which are formed by oxygen ions and metal ions composed of Nb elements and Ti elements, form blocks while sharing vertexes. In the crystal structure of the niobium-titanium composite oxide, side-sharing structures or tetrahedral structures, which are formed by oxygen ions and metal ions composed of Nb elements and Ti elements, are sandwiched among the blocks, and are connected to each other so as to be laminated in one axis direction.

For example, as the niobium-titanium composite oxide, there are a plurality of phases such as $TiNb_2O_7$, $Ti_2Nb_{10}O_{29}$, $TiNb_{14}O_{37}$, and $TiNb_{24}O_{62}$. The molar ratio of Nb/Ti in the niobium-titanium composite oxide determines which phase is formed among these crystal phases.

More preferably, the composite oxide contains a $TiNb_2O_7$ phase in which Nb/Ti=2. The composite oxide $TiNb_2O_7$ has a crystal structure belonging to a space group C2/m of monoclinic. In this crystal structure, octahedrons, which are formed by oxygen ions and metal ions comprised of Nb elements and Ti elements, form a block by vertically 3 pieces of the octahedrons and horizontally 3 pieces of octahedrons which share vertexes. In this crystal structure, the blocks are connected to each other by side-sharing to thereby form a layer, and these layers are laminated in b-axis direction. Because the structure of the composite oxide $TiNb_2O_7$ has the broadest vacant spaces among the niobium-titanium composite oxides, the composite oxide $TiNb_2O_7$ is characterized in that the active material capacity capable of inserting lithium ions is the highest.

Meanwhile, a composite oxide synthesized when the molar ratio is other than Nb/Ti=2 may be in a mixed phase state where the composite oxide contains any two or more phases of $TiNb_2O_7$, $Ti_2Nb_{10}O_{29}$, $TiNb_{14}O_{37}$, and $TiNb_{24}O_{62}$. The $TiNb_2O_7$, $Ti_2Nb_{10}O_{29}$, $TiNb_{14}O_{37}$, and $TiNb_{24}O_{62}$ phases are characterized in that the phases exhibit a smaller capacity and more excellent rate characteristics than those of the $TiNb_2O_7$ phase. For this reason, the niobium-titanium composite oxide containing the mixed phase can achieve improved rate characteristics. The composite oxide in which 1≤Nb/Ti≤2 can be obtained as a mixed phase of rutile type $TiO_2$ and $TiNb_2O_7$, for example. When the rutile type $TiO_2$ phase inserts Li, a part of the inserted Li can remain in the rutile type $TiO_2$ phase even if the active material is in a fully discharged state. The remaining Li can improve the electrical conductivity of the rutile type $TiO_2$ phase, and eventually the electrical conductivity of the whole active material. Therefore, the active material containing the mixed phase of the rutile type $TiO_2$ and $TiNb_2O_7$ can achieve a nonaqueous electrolyte battery capable of exhibiting excellent rate characteristics.

The Ti/Nb ratio is determined according to the design and application of a battery. However, from the viewpoint of not sacrificing the active material capacity, the Ti/Nb ratio is preferably 1.5≤Nb/Ti<5.

Next, $TiNb_2O_7$ as an example of the monoclinic niobium-titanium composite oxide will be described in more detail with reference to the drawings.

Figure 2:
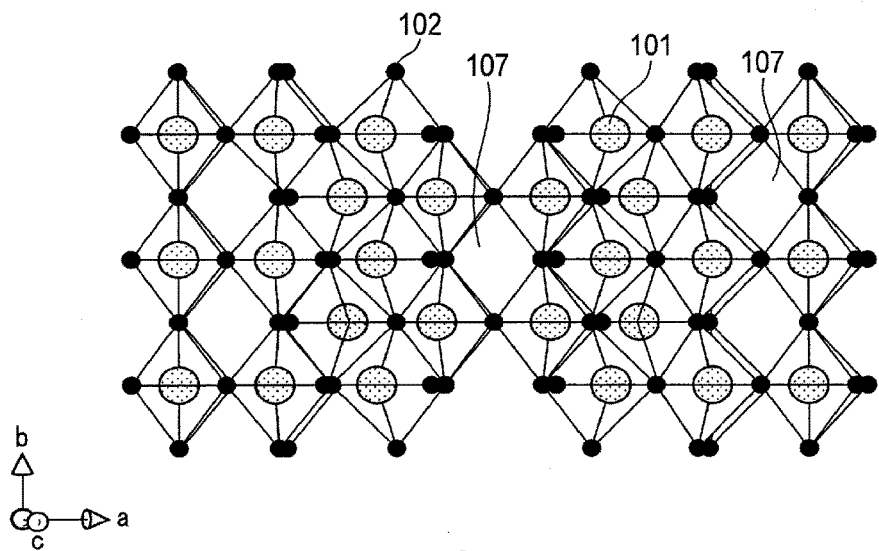
FIG. 2 is a pattern diagram of the crystal structure of FIG. 1 as seen from another direction.

FIG. 1 is a pattern diagram showing a crystal structure of monoclinic $TiNb_2O_7$. FIG. 2 is a pattern diagram of the crystal structure of FIG. 1 as seen from another direction.

As shown in FIG. 1, in the crystal structure of monoclinic $TiNb_2O_7$, metal ions 101 and oxide ions 102 constitute skeletal structures 103. Nb and Ti ions are randomly arranged in the locations of the metal ions 101 at a Nb/Ti ratio of 2:1. The skeletal structures 103 are three-dimensionally and alternately arranged, and voids 104 are present among the skeletal structures 103 as shown in FIG. 1. The void 104 serves as a host of a lithium ion. The voids 104 can occupy the large part of the whole crystal structure as shown in FIG. 1. In addition, the voids 104 can maintain a stable structure even if lithium ions are inserted.

When lithium ions are inserted in the voids 104, each of the metal ions 101 constituting the skeletal structure 103 is reduced to a trivalent one, thereby maintaining electrical neutrality of the crystal structure of $TiNb_2O_7$. In a monoclinic niobium-titanium composite oxide $TiNb_2O_7$, not only a Ti ion is reduced from tetravalent to trivalent, but an Nb ion is also reduced from pentavalent to trivalent. Because of this, the number of reduced valences per active material mass in the monoclinic composite oxide $TiNb_2O_7$ is more than that of a compound only containing Ti ions which are tetravalent cations. As a result, the monoclinic composite oxide $TiNb_2O_7$ can maintain the electrical neutrality of the crystal even if more lithium ions are inserted. Thus, because more lithium ions can be inserted, the energy density of the monoclinic composite oxide $TiNb_2O_7$ can be made higher than that of a compound only containing tetravalent cations, such as titanium oxide.

The monoclinic composite oxide $TiNb_2O_7$ having a crystal structure shown in FIGS. 1 and 2 has a plurality of areas having two-dimensional channels enabling rapid diffusion of lithium and lithium paths connecting these areas. Specifically, in FIG. 1, areas 105 and 106 are portions each having two-dimensional channels in directions [100] and [010]. As shown in FIG. 2, in the crystal structure of the monoclinic composite oxide $TiNb_2O_7$, voids 107 are present in a direction [001]. Each of the voids 107 has a tunnel structure advantageous for the conduction of lithium ions and serves as a lithium path connecting the areas 105 and 106 in a [001] direction. Due to the presence of the lithium paths 107, lithium ions can go back-and-forth between the areas 105 and 106 via each of the lithium paths 107.

Thus, the crystal structure of the monoclinic composite oxide $TiNb_2O_7$ has a large space into which lithium ions are equivalently inserted and has a structural stability. In addition, the monoclinic composite oxide $TiNb_2O_7$ can have a higher energy density than that of a compound containing no pentavalent cation. Furthermore, because the crystal structure of the monoclinic composite oxide $TiNb_2O_7$ has the areas 105 and 106 each having two-dimensional channels enabling rapid diffusion of lithium ions and the lithium paths 107 connecting these channels in the direction [001], the monoclinic composite oxide can increase the insertability and extractability of lithium ions into and from the insertion spaces, and effectually increase spaces contributing to the insertion and extraction of lithium ions. As a result, the monoclinic composite oxide $TiNb_2O_7$ can provide a high capacity. Specifically, the theoretical capacity of the monoclinic composite oxide $TiNb_2O_7$ is about 387 mAh/g, and is more than twice the value of titanium oxide having a spinel structure.

Even if the monoclinic niobium-titanium composite oxide has a different composition from the composition having the crystal structure described above, it can have a structure similar to the crystal structure shown in FIGS. 1 and 2. Therefore, the monoclinic niobium-titanium composite oxide can provide a high capacity.

The monoclinic niobium-titanium composite oxide exhibits a lithium-insertion potential of about 1.5 V (vs. $Li/Li^+$). Therefore, a battery which is capable of performing rapid charge-and-discharge stably and repeatedly can be provided by using the composite oxide as the active material.

For the above reasons, by using the active material containing the monoclinic niobium-titanium composite oxide, it is possible to provide an active material for a battery exhibiting excellent rapid charge-and-discharge performance and a high energy density.

In order to obtain the monoclinic niobium-titanium composite oxide as an active material having sufficient crystallinity, it is necessary to carry out sintering over a prolonged period of time at a high temperature of 1100° C. or more. However, there is a problem that such prolonged sintering at high temperature has poor productivity.

Examples of measures for solving this problem include a measure for making a precursor subjected to sintering contain a compound containing at least one element selected from the group consisting of Mo, V, and W as a sintering agent.

Generally, it is known that the compound containing at least one element selected from the group consisting of Mo, V, and W has a low melting point. When raw materials containing the compound having a low melting point are fired, the temperature of the compound reaches the melting point during firing, to form a liquid phase. The liquid phase can improve adhesiveness among particles. As a result, using the compound as a sintering agent makes low-temperature sintering possible.

In the niobium-titanium composite oxide, a part of Nb and/or Ti can be substituted by elements such as Mo, V, and W. For this reason, these elements can prevent a heterophase containing the remaining elements from being produced in the niobium-titanium composite oxide. Therefore, the active material containing the niobium-titanium composite oxide containing at least one element selected from the group consisting of Mo, V, and W can suppress cracks of the active material caused by stress accompanied by volume expansion or contraction during insertion and extraction of Li. Therefore, the nonaqueous electrolyte battery containing the active material particles containing the niobium-titanium composite oxide containing at least one element selected from the group consisting of Mo, V, and W can be stably charged and discharged.

Meanwhile, by adding the compound containing at least one element selected from the group consisting of Mo, V, and W in the conventional method, to make the compound function as a sintering agent, a sintering temperature can be lowered, but the rate characteristics and cycle characteristics of the obtained active material disadvantageously tend to be lower than those of the active material obtained without using the sintering agent.

As a result of the extensive studies, the present inventors found that this event is caused by the following description.

First, when the compound containing at least one element selected from the group consisting of Mo, V, and W is added as a sintering agent, and sintering is carried out for a prolonged time, crystal growth progresses in a single-axis direction in the niobium-titanium composite oxide. The niobium-titanium composite oxide in which the crystal anisotropically thus grows contains scale-like or needle-like coarse crystals. As a result, the niobium-titanium composite oxide thus obtained contains composite oxide particles having a large ratio of long-axis/short-axis, i.e., a large aspect ratio. Particularly, the uniaxial growth is apt to occur in a [010] direction which is the most significant for the diffusion of Li. For this reason, the increase in the aspect ratio accompanied by the uniaxial growth in the composite oxide particles is directly linked to an increase in a Li diffusion length in solid.

Meanwhile, as the amount of insertion of Li in the niobium-titanium composite oxide is increased, the diffusion velocity of Li ion in solid is decreased. For this reason, in a nonaqueous electrolyte battery produced by incorporating the niobium-titanium composite oxide in which the diffusion length in solid is increased by the uniaxial growth as described above into an electrode, an overvoltage occurs during charging, which causes an increase in an electrochemical load applied to the electrode. Furthermore, a long diffusion length in solid leads to decreases in the amounts of insertion and extraction of Li. Therefore, the nonaqueous electrolyte battery produced by incorporating the niobium-titanium composite oxide having a long diffusion length in solid into the electrode exhibits poor rate characteristics. Furthermore, in the nonaqueous electrolyte battery produced by incorporating the niobium-titanium composite oxide having a long diffusion length in solid into the electrode, an overvoltage applied to a negative electrode is increased, which causes a promotion of a side reaction on a reduction side, thereby deteriorating cycle characteristics.

The present inventors have conducted extensive studies based on the above findings, and have achieved an active material for a battery according to a first embodiment.

Specifically, regarding the active material particles contained in the active material for a battery according to the first embodiment, the aspect ratio for each of primary particles is within a range of 1 or more and less than 4. The crystallite size of each of the active material primary particles is within a range of 5 nm or more and 90 nm or less.

The active material particles of the niobium-titanium composite oxide in which the aspect ratio for each of the active material primary particles and the crystallite size of each of the active material primary particles are within the above-mentioned ranges respectively contain at least one element selected from the group consisting of Mo, V, and W. However, the increase in the Li diffusion length in solid in the active material particles during crystal growth has been suppressed. When the active material for a battery containing the active material particles is used in a state where it is incorporated into the nonaqueous electrolyte battery, the overvoltage during charging and the side reaction on the reduction side can be suppressed. From these results, the active material for a battery according to the first embodiment can achieve a nonaqueous electrolyte battery exhibiting excellent input-output characteristics and cycle characteristics.

Meanwhile, the active material particles each having an aspect ratio for a primary particle of 4 or more have a too long Li diffusion length in solid. Therefore, in the nonaqueous electrolyte battery into which the active material for a battery containing such active material particles of the niobium-titanium composite oxide is incorporated, rate characteristics and cycle characteristics are deteriorated by the occurrence of the overvoltage, the decreases in the amounts of insertion and extraction of Li, and the promotion of the side reaction on the reduction side or the like as described above. Should be noted that, because the aspect ratio is a ratio of long axis/short axis, and the long axis is not shorter than the short axis, the aspect ratio is not less than 1. The aspect ratio is preferably 1 or more and 3 or less.

The active material particles each having a crystallite size of less than 5 nm have too small crystallite sizes. In such active material particles, a Li insertion site is unstable because of the influence of the active material interface. As a result, the crystal structure is not stable during the insertion and extraction of Li, and the cycle characteristics are deteriorated with the increase in the side reaction. Meanwhile, the active material particles having a crystallite size of 90 nm or more have a too long Li diffusion length in solid. Therefore, in the nonaqueous electrolyte battery into which the active material for a battery containing such active material particles of the niobium-titanium composite oxide is incorporated, rate characteristics and cycle characteristics are deteriorated by the occurrence of the overvoltage, the decreases in the amounts of insertion and extraction of Li, and the promotion of the side reaction on the reduction side or the like as described above. The crystallite size is preferably 10 nm or more and 70 nm or less.

In the active material for a battery according to the first embodiment, the content of at least one element selected from the group consisting of Mo, V, and W in the monoclinic niobium-titanium composite oxide is 0.01 atm % or more and 2 atm % or less. The active material for a battery in which the content of at least one element selected from the group consisting of Mo, V, and W in the monoclinic niobium-titanium composite oxide is less than 0.01 atm % means a small additive amount of these elements functioning as a sintering agent during firing. Therefore, unless the active material for a battery is subjected to prolonged sintering at a high temperature, the densification of the crystal of the niobium-titanium composite oxide does not sufficiently progress, which cannot provide a phase having sufficient crystallinity. This makes it difficult to exhibit a sufficient capacity. When the content of the above-mentioned elements is more than 2 atm %, the content of the elements exceeds the solubility limit amount of the elements in the niobium-titanium composite oxide, which causes a state where a large amount of heterophases remain in the active material particles. The active material for a battery containing the active material particles thus containing the heterophases may cause cracks of the active material from stress accompanied by volume expansion or contraction during insertion and extraction of Li, which causes a deterioration in cycle characteristics.

The monoclinic niobium-titanium composite oxide can contain one element selected from the group consisting of Mo, V, and W, contain two element selected from the group consisting of Mo, V, and W, or contain Mo, V, and W.

The content of at least one element selected from the group consisting of Mo, V, and W in the monoclinic niobium-titanium composite oxide is preferably 0.01 atm % or more and 0.3 atm % or less.

The monoclinic niobium-titanium composite oxide contained in the active material for a battery according to the first embodiment can also contain further elements other than a Ti element, a Nb element, an O element (oxygen element, same as above), and at least one element selected from the group consisting of Mo, V, and W. Examples of further elements include Ta, Fe, Bi, Sb, As, P, Cr, B, Na, Mg, Al, and Si. One element may be used as the further element. Alternatively, two or more elements may be used as the further elements. It can be expected that these further elements can be substituted by a part of a Ti element and/or a part of a Nb element of the compound $TiNb_2O_7$ to improve the characteristics.

Therefore, the niobium-titanium composite oxide contained in the active material for a battery according to the first embodiment can be represented by the general formula of $Ti_{1-a-c}M1_aM3_cNb_{2-b-d}M2_bM4_dO_7$ ($0 \leq a < 1$, $0 \leq b < 1$, $0 < c+d < 1$). M1 and M3 in the general formula mean an element substituted for a part of a Ti element in the composition formula $TiNb_2O_7$. M2 and M4 in the general formula of the niobium-titanium composite oxide contained in the active material for a battery according to the first embodiment mean an element substituted for a part of a Nb element in the composition formula $TiNb_2O_7$. The elements M1 and M2 are at least one selected from the group consisting of Nb, Ta, Fe, Ti, Bi, Sb, As, P, Cr, B, Na, Mg, Al, and Si. The elements M1 and M2 may be the same or different from each other. The elements M3 and M4 are at least one selected from V, Mo, and W. The elements M3 and M4 may be the same or different from each other.

It can be expected that when the niobium-titanium composite oxide contained in the active material for a battery according to the first embodiment is one in which the Ti element in the compound $TiNb_2O_7$ has been partially substituted by the element M1 or the element M3 and/or the Nb element in the compound $TiNb_2O_7$ has been partially substituted by the element M2 or the element M4, the composite oxide can provide improved battery-characteristics. For example, when V, Ta, Bi, Sb, As or P is used as a substituted element, apart of the Nb element can be substituted and a part of the Ti element can be substituted. Because these elements are pentavalent, the electronic conductivity of the compound $TiNb_2O_7$ can be improved by substituting a part of the Ti element. Therefore, it can be expected that the capacity and rapid charge performance can be further improved. A hexavalent element such as Cr, Mo or W can substitute a part of the Ti element and Nb element. Therefore, the improvement of the electron conductivity of the compound $TiNb_2O_7$ can be expected. The elements such as B, Na, Mg and Si are lighter than the Ti element. Thus, it is expected that when a part of the Ti element is substituted by these elements, the capacity can be further improved. A trivalent element such as Fe or Al can substitute a part of the Ti element. Therefore, the improvement of the electron conductivity of the compound $TiNb_2O_7$ can be expected.

Even if a part of the Nb element is substituted by Ta in the compound $TiNb_2O_7$, equivalent characteristics can be obtained. This is attributed to the fact that Ta is a material contained in columbite (i.e., a mineral ore containing Nb), and Nb and Ta have the same physical, chemical, and electrical properties.

Oxygen deficiency may occur in a raw material or an intermediate product during preparation of a composite oxide. Inevitable impurities contained in the raw material as well as impurities mixed therein during the preparation may be present in the prepared composite oxide. Thus, the niobium titanium composite oxide may contain, for example, an oxide having the composition beyond the stoichiometric mixture ratio represented by the general formula of $Ti_{1-a-c}M1_aM3_cNb_{2-b-d}M2_bM4_dO_7$ ($0 \le a<1$, $0 \le b<1$, $0<c+d<1$) due to the inevitability factor. For example, due to the oxygen deficiency which occurs during the preparation of the oxide, an oxide having the composition represented by the general formula of $Ti_{1-a-c}M1_aM3_cNb_{2-b-d}M2_bM4_dO_{7-\delta}$ ($0 \le a<1$, $0 \le b<1$, $0<c+d<1$, $\delta<0.3$) may be prepared.

The monoclinic niobium-titanium composite oxide particles contained in the active material for a battery according to the first embodiment may contain at least one of primary particles and secondary particles formed by the aggregation of the primary particles. The primary particles may be in a state where a part of the surface of each of the primary particles is covered with a carbon-containing layer to form composite with carbon, for example. The secondary particles may be formed by the aggregation of primary particles each of which the composite with carbon. Alternatively, each of the secondary particles may be a secondary particle of which is formed by the aggregation of primary particles, and each of the secondary particles may have a surface a part of which is covered with carbon-containing layer to form composite with carbon.

The active material for a battery according to the first embodiment has an average primary particle size of, preferably 0.01 μm or more and 5 μm or less, and more preferably 0.1 μm or more and 3 μm or less. The active material for a battery according to the first embodiment has an average secondary particle size of, preferably 1 μm or more and 100 μm or less, and more preferably 5 μm or more and 30 μm or less.

The active material for a battery according to the first embodiment can be produced by a producing method using a liquid-phase synthesis method described below, for example.

In the liquid-phase synthesis method, the reaction progresses in a state where Nb elements and Ti elements are mixed at the atomic level, which makes it possible to obtain a monoclinic niobium-titanium composite oxide in a short firing time. Furthermore, in the producing method as this example, during firing, a temperature increase rate is set to 20° C./min or more at a temperature of 600° C. or more and 900° C. or less, to carry out rapid heating. In such a producing method, the anisotropic growth and grain growth of the crystal can be suppressed, which makes it possible to obtain a small active material having a crystallite size within a range of 5 nm or more and 90 nm or less and an aspect ratio for a primary particle within a range of 1 or more and less than 4. Specifically, the producing method is as follows. Should be noted that, in the description of an example of the following producing method, at least one element selected from the group consisting of Mo, V, and W is referred to as an additive element.

First, an acid solution (A) in which a Ti compound is dissolved, an acid solution (B) in which a Nb compound is dissolved, and an acid solution (C) containing an additive element are mixed to prepare a mixed solution. The starting materials of the respective acid solutions are not particularly limited, and a solution which is obtained by dissolving hydroxides, sulfides, oxides, salts, alkoxides and organic materials in a suitable solvent such as pure water, ethanol, or an acid can be used. The molar ratio of each element in the mixed solution indicates the molar ratio at the time of using, which may be different from the composition ratio of each element in the produced active material.

Next, the mixed solution prepared as described above is mixed with an alkaline solution as a pH adjusting agent, to precipitate a coprecipitated product. The pH adjusting agent is preferably an alkaline solution, the pH of which is preferably 8 or more and more preferably 12 or more. The solution having the higher pH is preferable because a coprecipitated product can be precipitated with the smaller liquid amount thereof. As the pH adjusting agent, ammonia water can be used, for example. In the mixing method, a pH adjusting agent may be added dropwise to the mixed solution, and inversely, the mixed solution may be added dropwise to a pH adjusting agent. The aggregation degree and particle shape of a precipitated product can be controlled by adjusting a method, a speed and timing of dropwise-addition of a liquid, and a solution temperature or the like. More preferably, it is preferable to set a solution temperature to room temperature or lower, and gradually add a small amount of a pH adjusting agent to the mixed solution, from the view of suppressing excessive aggregation. The pH of the mixed solution containing Ti and Nb is adjusted to an alkaline side by adding a pH adjusting agent. The pH adjustment can be carried out while the precipitation state of the coprecipitated product is monitored, and the pH is adjusted within the range of 1 or more and 10 or less as a guide and preferably within the range of 6 or more and 9 or less. Thereby, it is possible to precipitate the coprecipitated product containing Ti, Nb, and an additive element.

Finer particles can be obtained by carrying out a closed heat treatment in an autoclave container before and after the step for the pH adjustment. It is preferable that a heat treatment temperature in the autoclave container is 160° C. or more and 200° C. or less, and a firing time is 5 hours or more.

Next, the precipitated coprecipitated product is washed. As a solution used for this washing, pure water is preferable, for example. As a guide, washing is sufficiently carried out until the pH of the waste solution subjected to the washing become close to the range of 6 to 8 and preferably close to neutrality. After the sufficient washing, filtration and drying are carried out, and thereby precursor powders can be obtained.

The precursor thus obtained is the precipitated product in which Nb, Ti, and the additive element are homogeneously mixed and more preferably the amorphous composite hydroxide. By preparing the amorphous precursor powder in which Nb, Ti, and the additive element are homogeneously mixed as described above, the reactivity during firing can be enhanced. Therefore, the monoclinic niobium-titanium composite oxide can be obtained by firing the amorphous precursor powder at lower temperature for a shorter time than a solid-phase reaction method or the like. That is, in the method as this example, it is possible to suppress the temperature and the time in the firing step.

The precursor powder subjected to filtration and drying may form an aggregated powder. The particle sizes of the primary particles may be random because of the influence of the types of raw materials. In that case, it is preferable to grind the aggregated powder by a mechanical grinding method such as a ball mill or a bead mill.

Next, the obtained precursor powder is subjected to sintering. This firing is carried out at a temperature within the range of 600° C. 900° C. More preferably, the firing is carried out at a temperature within the range of 700° C. to 800° C. The firing time is set to the range of 1 minute to 1 hour. More preferably, the firing time is set to the range of 30 minutes to 1 hour. By carrying out the firing under these conditions, it is possible to form the phase of the monoclinic niobium-titanium composite oxide having high crystallinity.

Furthermore, the temperature-rising rate in the firing is set to 20° C./min or less. Because the retention time at high temperatures is decreased by thus increasing the temperature-rising rate, the anisotropic growth of the crystal can be suppressed, which makes it possible to obtain particles each having a small aspect ratio for a primary particle.

From the viewpoint of improving the crystallinity while suppressing the grain growth and necking among particles, an annealing step in which an annealing temperature is within the range of 600° C. to 700° C. and lower than the first firing temperature, and an annealing time is 1 minute to 1 hour can be provided before and after the above-mentioned firing step. Also in the annealing step, a temperature-rising rate is set to 20° C./min or more.

The atmosphere for the firing may be an air atmosphere, a vacuum atmosphere or an inert gas atmosphere such as nitrogen, argon or helium, but an oxidizing atmosphere is preferable to obtain an oxide, and specifically an air atmosphere is preferable. The firing may be carried out in an air atmosphere wherein an oxygen concentration is intentionally increased.

In the powders subjected to the firing, the particles may be necked, and the particles may excessively grow. Therefore, it is preferable to carryout grinding by a mechanical grinding method such as a ball mill or a bead mill because the finer microparticles can be formed. However, the crystallinity of the active material may be deteriorated when carrying out the machinery grinding. This phenomenon can be remedied by providing again the annealing step, in which the annealing temperature is within the range of 600° C. to 800° C. and the annealing time is 1 minute to 1 hour, after the grinding step, which is preferable. Also in the annealing step, the anisotropic growth of the crystal can be suppressed by setting the temperature-rising rate to 20° C./min or more.

The powder subjected to the firing can be further treated to forming a composite with carbon. The method for forming a composite with carbon is not particularly limited. Examples of a carbon source include saccharides, polyolefins, nitriles, alcohols and benzene ring-containing organic compounds. By a mechanical method such as a planetary ball mill, carbon black or graphite or the like can be supported on the powder subjected to the firing. The forming the composite can be carried out by, for example, mixing the powder subjected to the firing and a carbon source, and then firing the mixture in a reducing atmosphere. The firing temperature is preferably 900° C. or less. When the firing temperature exceeds 900° C., the reduction reaction of a Nb element may progress, and a heterophase may be precipitated. Appropriate examples of the reducing atmosphere include atmospheres such as nitrogen, carbon dioxide and argon.

When the particle size of the powder subjected to the firing is 1 μm or less, it is preferable to carry out granulation through a method such as spray drying because the dispersibility of a slurry in an electrode production step is improved and the coating fluidity thereof is stabilized.

Next, there will be described a method for determining the composition ratio of the elements contained in the active material for a battery, a method for calculating the aspect ratio for a primary particle of the active material particles, and a method for calculating the crystallite size.

The active material powder can be subjected to each measurement after being conditioned according to a generally known pretreatment method.

Meanwhile, when the active material for a battery incorporated in a battery is measured, the active material for a battery is taken out from the battery as follows.

First, in order to confirm the crystalline state of the active material particles contained in the active material for a battery, a state is made where lithium ions are completely extractiond from the niobium-titanium composite oxide. For example, when measurement is carried out for active material particles contained in a negative electrode, a battery is put into a completely discharged state. However, slightly remaining lithium ions may exist even in a discharged state.

Next, a battery is disassembled in a glove box filled with argon, and the electrode containing the active material to be measured is taken out. Then, the taken-out electrode is washed using an appropriate solvent. As the solvent to be used herein, a nonaqueous solvent of nonaqueous electrolyte, such as ethyl methyl carbonate, is preferably used when the battery is a nonaqueous electrolyte battery.

Next, a layer containing the active material to be measured (for example, a negative electrode layer described below) is separated from the washed negative electrode. For example, the layer containing the active material can be separated by irradiating an electrode substrate with an ultrasonic wave in a solvent.

Next, the layer containing the active material is heated in the atmosphere for a short time. The heating is carried out for 1 hour at 500 C, for example. Other components such as a binder and a conductive agent can be removed by heating. Meanwhile, the molar ratio of the elements constituting the active material does not change even after heating. The residue obtained after heating is dissolved in an acid so as to prepare a measurement sample. This measurement sample is subjected to each composition analysis. In SEM measurement, the measurement sample is observed in a powder state without being dissolved in an acid.

<Method for Determining Composition Ratio>

The composition of the active material for a battery, and the content of each element contained in the active material can be identified with an inductively coupled plasma (ICP) emission analysis method and an inert gas fusion infrared insertion method.

Specifically, first, an active material to be measured is dissolved according to alkali dissolution or acid decomposition, to prepare a measurement sample. When the active material contained in the battery is analyzed, the residue remaining after heating a phase containing the active material as described above is dissolved in an acid to prepare a measurement sample. In the preparation, the amount of dissolution (concentration) of the active material in the measurement sample is grasped.

The measurement sample prepared as described above is subjected to analysis according to an ICP emission analysis method to measure the concentration of each metallic element per unit weight in the measurement sample. From the measurement result, the composition ratio of the metallic elements contained in the active material can be calculated.

As the content of an O element contained in the active material, the concentration of the O element per unit weight of the active material can be calculated according to an inert gas fusion infrared absorption method.

From the result obtained according to the above-mentioned method, the amount of substance of each of a Ti element, a Nb element, at least one element of Mo, W, or V, other substitution element, and an O element per unit weight for the active material can be calculated. The composition ratio (molar ratio) of each element in the active material can be calculated from these amounts of substance for the elements.

The content of at least one selected from the group consisting of Mo, W, and V in the niobium-titanium composite oxide can be calculated as percentage of a molar ratio (unit: atm %) by dividing the amount of substance for at least one element of Mo, W, or V per unit weight for the active material calculated according to the above-mentioned method with the total amount of substance of a Ti element, a Nb element, at least one element of Mo, W, or V, other substitution element, and an O element.

When the active material to be measured contains a mixed phase of a niobium-titanium composite oxide phase and other phase, there is a problem that the percentage of the above-mentioned molar ratio cannot be strictly measured. When the active material contains a plurality of phases, the composition ratio of the niobium-titanium composite oxide phase can be determined as follows, for example.

First, an active material is subjected to wide angle X-ray scattering measurement. The wide angle X-ray scattering measurement will be described below. The wide angle X-ray scattering measurement carried out herein is carried out under the condition where the result for Rietveld analysis is obtained. The result obtained by the wide angle X-ray scattering measurement is subjected to Rietveld analysis. The composition ratio of each phase contained in the active material is separated from the result.

Meanwhile, the active material is subjected to EDX analysis or the like, to quantify each of constituent elements of a Ti element, a Nb element, at least one element of Mo, W, or V, other substitution element, and an O element contained in the phase other than the niobium-titanium composite oxide. Thereby, the amount of substance of each of the constituent elements per unit weight for the phase other than the niobium-titanium composite oxide can be calculated.

By subtracting the amount of substance of each of constituent elements per unit weight for the phase other than the niobium-titanium composite oxide from the amount of substance, which is previously quantified, of each of elements contained in the unit weight of the active material, the amount of substance of each of constituent elements per unit weight for the niobium-titanium composite oxide contained in the active material can be calculated. The content of at least one element of Mo, W, or V in the niobium-titanium composite oxide can be determined from the result.

<Method for Calculating Aspect Ratio for Primary Particle of Active Material Particles>

The aspect ratio for a primary particle of the active material particles is defined as a ratio B/A of a particle size B to a particle size A. The particle size A is a particle size in a direction in which the particle size of a primary particle is the shortest, i.e., in a short axis direction. The particle size B is a particle size in a direction in which the particle size is the longest, i.e., in a long axis direction. It is preferable that the active material particles contained in the active material for a battery according to the first embodiment have an aspect ratio for a primary particle of 1 or more and less than 4 and do not contain a large amount of particles having an aspect ratio of 4 or more.

An aspect ratio for a primary particle is calculated as follows. First, from the SEM image, one primary particle having the highest aspect ratio contained therein is selected. A plurality of particles aggregated or joined to each other by necking are considered to be independent primary particle, respectively. Next, a particle size in a direction in which the particle size is the shortest is defined as A, and a particle size in a direction in which the particle size is the longest is defined as B. The primary particle aspect ratio is defined by calculating a ratio B/A. The same operation is carried out for each of 30 images selected at random, calculating the ratios from the results thereof, and the average value thereof is defined as the aspect ratio for a primary particle of the active material particles. Measurement conditions for SEM are conditions described in Examples, for example.

<Method for Calculating Crystallite Size of Active Material Particles>

The crystallite size of the active material particles can be calculated by obtaining the half-value width of a peak from an X-ray diffraction pattern for the active material particles obtained according to a wide angle X-ray diffraction method, and using the Scherrer's equation shown below.

A value obtained by subjecting the spectrum to fitting is used as the half-value width of the peak. The spectrum is subjected to fitting as follows. First, removal of a background, separation of a Kα1 peak form a Kα2 peak, and a pretreatment according to smoothing are carried out. Next, the spectrum after the pretreatment is subjected to peak search according to secondary differentiation. Next, a background profile is obtained by deducting a peak profile formed from the peak selected by the peak search from the spectrum after the pretreatment. The background profile thus obtained is subjected to fitting according to a polynomial equation. By subjecting the spectrum after the pretreatment to profile fitting according to the least square method using information on the peak profile formed from the peak selected by the peak search and information on the background, each of variables of peak information and the information on the background is optimized. A division type pseudo Voigt function is used as a fitting function of the peak. The method can carry out an automatic profile treatment using, for example, analysis software "Rigaku PDXL2 ver.2.1" to automatically carry out a series of operations. The half-value width of each of the peaks can be obtained by the above-mentioned method.

$$\text{Crystallite size(nm)} = \frac{K\lambda}{\beta \cos\theta}$$

$$\beta = \sqrt{\beta_e^2 + \beta_o^2}$$

Herein, K: Scherrer constant, λ: wavelength of Cu-Kα ray (=0.15406=), $\beta_e$: half-value width of diffraction peak, $\beta_o$: corrected width of half-value width are set.

The diffraction peak used for calculation is a peak obtained within the range of 2θ=23.9317 degrees±0.2 degree corresponding to a (110) plane of the crystal structure of a monoclinic niobium-titanium composite oxide $TiNb_2O_7$ belonging to a space group C2/m. The Scherrer constant is set to K=0.94. The corrected width of the half-value width on the above-mentioned conditions is set to Y=0. However, different measurement systems are considered to have different half-value widths. In this case, an exact value can be obtained by calculating the corrected value using the standard sample.

Next, the wide-angle X-ray diffraction measurement for the active material for a battery will be described. The wide-angle X-ray diffraction measurement is carried out in order to determine the crystallite size of the active material particles.

First, active material particles contained in a sample subjected to measurement are ground such that aggregations thereof are sufficiently loosened. As a guide, it is preferable that the average particle size become 20 μm or less. The average particle size can be obtained by a laser diffraction type particle size distribution measuring apparatus.

Next, the groung sample is filled into a holder portion of a glass sample plate. As a sample stage, it is possible to use a glass sample plate having a holder portion having a depth of 0.2 mm, for example. After the sample was filled in the holder portion, this sample is pressed using a glass plate sufficiently to smooth the surface thereof. The glass sample plate, in which the sample is thus filled, is loaded into a powder X-ray diffractometer, and the measurement according to an X-ray diffraction method using Cu-Kα ray is carried out.

The measurement can be carried out using the following measuring apparatus and measurement conditions, for example.

X-ray diffractometer: "SmartLab" manufactured by Rigaku Corporation
X-ray source: CuKα ray
Output: 40 kV, 200 mA
Package measurement name: general-purpose measurement (concentration method)
Incidental parallel slit aperture angle: 5. degrees
Incidental longitudinal-limiting slit length: 10 mm
Light-receiving PSA: N/A
Light-receiving parallel slit aperture angle: 5. degrees
Monochromatic method: Kβ filter method
Measurement mode: continuation
Incidental slit width: 0.5. degree
Light-receiving slit width: 20 mm
Measurement range (2θ): 5 degrees to 70 degrees
Sampling width (2θ): 0.01 degree
Scanning speed: 20 degrees/min When the active material to be measured is contained in the electrode material of the nonaqueous electrolyte battery, first, the electrode is taken out from the nonaqueous electrolyte battery according to the previously described procedure. The taken-out and washed electrode is cut to the size almost equal to the area of the holder of a powder X-ray diffractometer, and used as the measurement sample.

The obtained measurement sample is affixed directly to the glass holder, and measured. In this case, the peaks of a current collector foil, a conductive auxiliary agent and a binder are preliminarily measured using XRD, and the peak positions derived therefrom are confirmed. When there are the peaks overlapping those of active material particles, it is necessary to separate the materials having the peaks other than those of active material particles. When the peaks of the substrate and the active material overlap to each other, it is desirable that the layer containing the active material (e.g., the below-described electrode layer) be separated from the substrate, and subjected to measurement. This is a process for separating the overlapping peaks when the peak intensity is quantitatively measured.

As described above, it is possible to carry out a wide-angle X-ray diffraction measurement for the active material contained in a battery.

In order to collect the data for Rietveld analysis, the measurement time or the x-ray intensity is appropriately adjusted in such a manner that the step width is made of ⅓ to ⅕ the minimum half width of the diffraction peaks, and the intensity at the peak position of highest reflected intensity is 5,000 cps or more.

According to the first embodiment, an active material for a battery is provided. The active material for a battery contains active material particles of a monoclinic niobium-titanium composite oxide. The monoclinic niobium-titanium composite oxide contains at least one element selected from the group consisting of Mo, V, and W. The content of at least one element selected from the group consisting of Mo, V, and W in the monoclinic niobium-titanium composite oxide is within a range of 0.01 atm % or more and 2 atm % or less. Each of the active material particles has an aspect ratio for a primary particle within a range of 1 or more and less than 4. Each of the active material particles has a crystallite size within a range of 5 nm or more and 90 nm or less. Because an increase in a Li diffusion length in solid in the active material particles during crystal growth has been suppressed in the active material for a battery, the occurrence of an overvoltage during charging and a side reaction on a reduction side can be suppressed when the active material for a battery is used in a state where it is incorporated in a nonaqueous electrolyte battery. As a result, the active material for a battery according to the first embodiment can achieve a nonaqueous electrolyte battery exhibiting excellent input-output characteristics and excellent cycle characteristics.

Second Embodiment

According to a second embodiment, a nonaqueous electrolyte battery is provided. The nonaqueous electrolyte battery includes a negative electrode, a positive electrode, and a nonaqueous electrolyte. The a negative electrode contains the active material for a battery according to the first embodiment.

The nonaqueous electrolyte battery according to the second embodiment can further include a separator provided between the positive electrode and the negative electrode. The positive electrode, the negative electrode, and the separator can constitute an electrode group. The nonaqueous electrolyte may be held in the electrode group.

The nonaqueous electrolyte battery according to the second embodiment can further include a container member accommodating the electrode group and the nonaqueous electrolyte.

The nonaqueous electrolyte battery according to the second embodiment can further include a positive electrode terminal electrically connected to the positive electrode and a negative electrode terminal electrically connected to the negative electrode. At least a part of the positive electrode terminal and at least a part of the negative electrode terminal may be extended to the outside of the container member.

Hereinafter, the positive electrode, the negative electrode, the nonaqueous electrolyte, the separator, the container member, the positive electrode terminal, and the negative electrode terminal will be described in detail.

1) Positive Electrode

The positive electrode can include a current collector and a positive electrode layer (positive electrode active material-containing layer). The positive electrode layer may be formed on one or both surfaces of the current collector. The positive electrode layer can include a positive electrode active material, and optionally a conductive agent and a binder.

As the positive electrode active material, for example, an oxide, a sulfide and a polymer or the like can be used. Examples of the oxide and sulfide which can be used include a compound capable of absorbing and releasing lithium. Specific examples thereof include manganese dioxide ($MnO_2$), iron oxide, copper oxide, nickel oxide, lithium manganese composite oxide (e.g., $Li_xMn_2O_4$ or $Li_xMnO_2$), lithium nickel composite oxide (e.g., $Li_xNiO_2$), lithium cobalt composite oxide (e.g., $Li_xCoO_2$), lithium nickel cobalt composite oxide (e.g., $LiNi_{1-y}Co_yO_2$), lithium manganese cobalt composite oxide (e.g., $Li_xMn_yCo_{1-y}O_2$), lithium manganese nickel composite oxide having a spinel structure (e.g., $Li_xMn_{2-y}Ni_yO_4$), lithium phosphorus oxide having an olivine structure (e.g., $Li_xFePO_4$, $Li_xFe_{1-y}Mn_yPO_4$, and $Li_xCoPO_4$), iron sulfate ($Fe_2(SO_4)_3$), vanadium oxide (e.g., $V_2O_5$) and lithium nickel cobalt manganese composite oxide. In the above-described formula, $0<x\leq1$, and $0<y\leq1$. As the active material, one of these compounds may be used singly, or combination of two or more of the compounds can be used.

As the polymer, for example, conductive polymer materials such as polyaniline and polypyrrole, and disulfide polymer materials may be used. Sulphur (S) and carbon fluoride may also be used as the active material.

More preferred examples of the positive electrode active material include lithium manganese composite oxide exhibiting a high positive electrode voltage (e.g., $Li_xMn_2O_4$), lithium nickel composite oxide (e.g., $Li_xNiO_2$), lithium cobalt composite oxide (e.g., $Li_xCoO_2$), lithium nickel cobalt composite oxide (e.g., $LiNi_{1-y}Co_yO_2$), lithium manganese nickel composite oxide having a spinel structure (e.g., $Li_xMn_{2-y}Ni_yO_4$), lithium manganese cobalt composite oxide (e.g., $Li_xMn_yCo_{1-y}O_2$), lithium iron phosphate (e.g., $Li_xFePO_4$), and lithium nickel cobalt manganese composite oxide. In the above-described formula, $0<x\leq1$, and $0<y\leq1$.

When an ordinary-temperature molten salt is used as the nonaqueous electrolyte of the battery, in the light of cycle life, preferred examples of the positive electrode active material include lithium iron phosphate, $Li_xVPO_4F$, lithium manganese composite oxide, lithium nickel composite oxide, and lithium nickel cobalt composite oxide. This is because these compounds have low reactivity with ordinary-temperature molten salts.

The specific surface area of the positive electrode active material is preferably 0.1 m$^2$/g or more and 10 m$^2$/g or less. The positive electrode active material having a specific surface area of 0.1 m$^2$/g or more can secure sufficient sites in which lithium ions can be inserted and extracted. The positive electrode active material having a specific surface area of 10 m$^2$/g or less is easy to handle during industrial production, and can secure a good charge-and-discharge cycle performance.

The binder is added to fill the gaps in the dispersed positive electrode active material, and can bind the positive electrode active material with conductive agent. Examples of the binder include polytetrafluoroethylene (PTFE), polyvinylidene fluoride (PVdF), and fluorine rubber.

The conductive agent is as necessary added to improve the current collection performance, and to suppress the contact resistance between the positive electrode active material and current collector. Examples of the conductive agent include carbonaceous substances such as acetylene black, carbon black and graphite.

In the positive electrode layer, the blending ratios of the positive electrode active material and binder are preferably 80% by mass or more and 98% by mass or less, and 2% by mass or more and 20% by mass or less, respectively.

When the binder content is 2% by mass or more, sufficient electrode strength can be achieved. When the binder content is 20% by mass or less, the loading of the insulator in the electrode can be reduced, and thereby the internal resistance can be decreased.

When a conductive agent is added, the blending ratios of the positive electrode active material, binder, and conductive agent are preferably 77% by mass or more and 95% by mass or less, 2% by mass or more and 20% by mass or less, and 3% by mass or more and 15% by mass or less, respectively. When the content of the conductive agent is 3% by mass or more, the above-described effects can be achieved. By setting the amount of the conductive agent to 15% by mass or less, the decomposition of a nonaqueous electrolyte on the surface of the positive electrode conductive agent in high-temperature storage can be reduced.

The positive electrode current collector is preferably an aluminum foil, or an aluminum alloy foil containing an element such as Mg, Ti, Zn, Ni, Cr, Mn, Fe, Cu, or Si.

The thickness of the aluminum foil or aluminum alloy foil is preferably 5 μm or more and 20 μm or less, and more preferably 15 μm or less. The purity of the aluminum foil is preferably 99% by mass or more. The content of the transition metal such as iron, copper, nickel, or chromium contained in the aluminum foil or aluminum alloy foil is preferably 1% by mass or less.

The positive electrode is produced by, for example, suspending a positive electrode active material, a binder, and as necessary a conductive agent in an appropriate solvent to prepare a slurry, applying the slurry to a positive electrode current collector, drying the coating to form a positive electrode layer, and then pressing the layer. Alternatively, the positive electrode may be also produced by forming an active material, a binder, and as necessary a conductive agent into pellets to produce a positive electrode layer, and placing it on a current collector.

2) Negative Electrode

The negative electrode can contain a current collector, and a negative electrode layer (a negative electrode active material-containing layer). The negative electrode layer can be formed on one or both surfaces of the current collector. The negative electrode layer can contain a negative electrode active material, and optionally a conductive agent and a binder.

The active material for a battery according to the first embodiment can be contained in the negative electrode layer as a negative electrode active material.

In the active material for a battery according to the first embodiment, as described above, the increase in the Li diffusion length in solid in the active material particles during crystal growth has been suppressed. Therefore, the nonaqueous electrolyte battery including the negative electrode containing the active material for a battery according to the first embodiment can exhibit excellent input-output characteristics and excellent cycle characteristics.

In the negative electrode layer, the active material according to the first embodiment may be singly used as the negative electrode active material. However, the negative electrode layer may further contain other negative electrode active materials. Usable examples of the other negative active materials include anatase type titanium dioxide $TiO_2$, monoclinic β-type titanium dioxide $TiO_2(B)$, ramsdellite type lithium titanate $Li_2Ti_3O_7$, spinel-type lithium titanate $Li_4Ti_5O_{12}$, and niobium oxide. These oxides and composite oxides can be preferably used because the specific gravities thereof are close to those of the compounds contained in the active material for a battery according to the first embodiment, and these are easily mixed and dispersed.

The conductive agent is as necessary added to can improve a current collection performance of the negative active material and to suppress the contact resistance between the negative electrode active material and the current collector. Examples of the conductive agent include carbonaceous substances such as acetylene black, carbon black, and graphite.

The binder is added to fill gaps in the dispersed negative electrode active material, and can bind the negative electrode active material with the conductive agent. Examples of the binder include polytetrafluoroethylene (PTFE), polyvinylidene fluoride (PVdF), fluorine rubber, and styrene-butadiene rubber.

The blending ratios of the active material, conductive agent and binder in the negative electrode layer are preferably 68% by mass or more and 96% by mass or less, 2% by mass or more and 30% by mass or less, and 2% by mass or more and 30% by mass or less, respectively. When the content of the conductive agent is 2% by mass or more, the current collection performance of the negative electrode layer can be improved. When the content of the binder is 2% by mass or more, binding between the negative electrode layer and current collector is sufficiently achieved, and excellent cycling characteristics can be expected. On the other hand, each of the contents of the conductive agent and binder is preferably 30% by mass or less, thereby increasing the capacity.

As the negative electrode current collector, a material which is electrochemically stable at the lithium insertion and extraction potential of the negative electrode active material is used. The negative electrode current collector is preferably made of copper, nickel, stainless steel or aluminum, or an aluminum alloy containing an element such as Mg, Ti, Zn, Mn, Fe, Cu, and Si. The thickness of the current collector is preferably 5 µm or more and 20 µm or less. The current collector having such a thickness can keep a balance between the strength and weight reduction of the negative electrode.

The negative electrode is produced by, for example, suspending a negative electrode active material, a conductive agent, and a binder in an ordinary solvent to prepare a slurry, applying the slurry to a current collector, drying the coating to form a negative electrode layer, and then pressing the layer. Alternatively, the negative electrode may be also produced by forming a negative electrode active material, a binder, and a conductive agent into pellets to produce a negative electrode layer, and placing it on a current collector.

3) Nonaqueous Electrolyte

The nonaqueous electrolyte may be, for example, a liquid nonaqueous electrolyte which is prepared by dissolving an electrolyte in an organic solvent, or gel-like nonaqueous electrolyte which is a composite of a liquid electrolyte and a polymer material.

The liquid nonaqueous electrolyte is preferably prepared by dissolving an electrolyte in an organic solvent in the concentration of 0.5 mol/L or more and 2.5 mol/L or less.

Examples of the electrolyte include lithium salts such as lithium perchlorate ($LiClO_4$), lithium hexafluorophosphate ($LiPF_6$), lithium tetrafluoroborate ($LiBF_4$), lithium hexafluoroarsenate ($LiAsF_6$), lithium trifluoromethanesulfonate ($LiCF_3SO_3$), and lithium bistrifluoromethylsulfonylimide ($LiN(CF_3SO_2)_2$), and mixtures thereof. The electrolyte is preferably resistant to oxidation even at a high potential, and most preferably $LiPF_6$.

Examples of the organic solvent include a cyclic carbonate such as propylene carbonate (PC), ethylene carbonate (EC), or vinylene carbonate; a chain carbonate such as diethyl carbonate (DEC), dimethyl carbonate (DMC), or methyl ethyl carbonate (MEC); a cyclic ether such as tetrahydrofuran (THF), 2-methyl tetrahydrofuran (2MeTHF), or dioxolane (DOX); a chain ether such as dimethoxy ethane (DME) or diethoxy ethane (DEE); γ-butyrolactone (GBL), acetonitrile (AN), and sulfolane (SL). One of these organic solvents can be used alone or a mixed solvent can be used.

Examples of the polymeric material include polyvinylidene fluoride (PVdF), polyacrylonitrile (PAN), and polyethylene oxide (PEO).

Alternatively, the nonaqueous electrolyte may be, for example, an ordinary-temperature molten salt (ionic melt) containing lithium ions, a polymer solid electrolyte, or an inorganic solid electrolyte.

The ordinary-temperature molten salt (ionic melt) means compounds which can exist in a liquid state at ordinary temperature (15 to 25° C.) among organic salts constituted of combinations of organic cations and anions. The ordinary-temperature molten salt includes an ordinary-temperature molten salt which exists alone as a liquid, an ordinary-temperature molten salt which becomes a liquid after being mixed with an electrolyte, and an ordinary-temperature molten salt which becomes a liquid after being dissolved in an organic solvent. In general, the melting point of the ordinary-temperature molten salt used in nonaqueous electrolyte batteries is 25° C. or below. The organic cations generally have a quaternary ammonium skeleton.

The polymer solid electrolyte is prepared by dissolving the electrolyte in a polymeric material, and solidifying it.

The inorganic solid electrolyte is a solid substance having lithium ion conductivity.

4) Separator

The separator may be made of, for example, a porous film or synthetic resin nonwoven fabric containing polyethylene, polypropylene, cellulose, or polyvinylidene fluoride (PVdF). Among these, a porous film containing polyethylene or polypropylene can improve safety because the porous film melts at a fixed temperature to be able to shut off a current.

5) Container Member

The container member may be, for example, a laminate film having a thickness of 0.5 mm or less, or a metal case having a wall thickness of 1 mm or less. The thickness of the laminate film is more preferably 0.2 mm or less. The wall thickness of the metal case is more preferably 0.5 mm or less, and still more preferably 0.2 mm or less.

The shape of the container member may be, for example, flat (thin), square, cylinder, coin, or button-shaped. The container member depends on the size of the battery, and may be that for a compact battery mounted on mobile electronic devices, and a large battery mounted on two- to four-wheel automobiles.

The laminate film used herein is a multilayer film including resin layers and a metal layer sandwiched between the resin layers. The metal layer is preferably an aluminum foil or an aluminum alloy foil for reducing weight. The resin layer may be, for example, a polymeric material such as polypropylene (PP), polyethylene (PE), nylon, or polyethylene terephthalate (PET). The laminate film may be heat-sealed to be formed into the shape of a container member.

The metal case is made of aluminum or an aluminum alloy, for example. As the aluminum alloy, an alloy containing an element such as magnesium, zinc, or silicon is preferable. If a transition metal such as iron, copper, nickel, or chromium is contained in the alloy, the content thereof is preferably set to 1% by mass or less.

Next, the nonaqueous electrolyte battery according to the second embodiment will be more specifically described with reference to the drawings.

Figure 3:
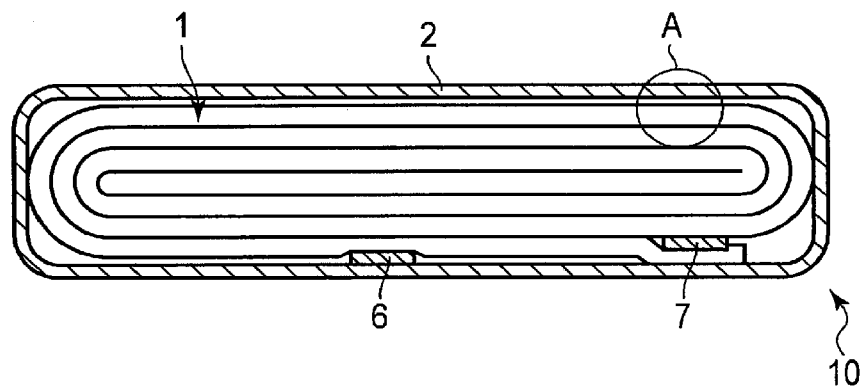
FIG. 3 is a cross-sectional view of a flat-shaped nonaqueous electrolyte battery as an example according to a second embodiment.
Figure 4:
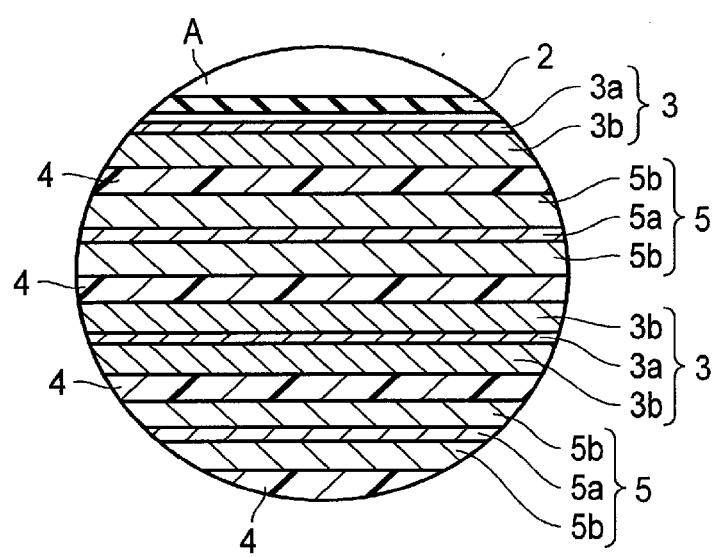
FIG. 4 is an enlarged sectional view of an A portion of FIG. 3.

FIG. 3 is a cross-sectional view of a flat-shaped nonaqueous electrolyte battery as an example according to the second embodiment. FIG. 4 is an enlarged sectional view of an A portion of FIG. 3.

A nonaqueous electrolyte battery 10 shown in FIGS. 3 and 4 includes a bag-shaped container member 2 shown in FIG. 3, an electrode group 1 shown in FIGS. 3 and 4, and a nonaqueous electrolyte (not shown). The electrode group 1 and the nonaqueous electrolyte are accommodated in the container member 2. The nonaqueous electrolyte is held in the electrode group 1.

The bag-shaped container member 2 is made of a laminate film including two resin layers and a metal layer sandwiched between the resin layers.

As shown in FIG. 3, the electrode group 1 is a coiled electrode group in a flat form. The coiled electrode group 1 in a flat form is formed by, as shown in FIG. 4, spirally winding a laminate which includes, from the outside to the inside, a negative electrode 3, a separator 4, a positive electrode 5, and a separator 4, and then press-forming the wound laminate.

The negative electrode 3 includes a negative electrode current collector 3a and a negative electrode layer 3b. The negative electrode layer 3b contains the active material for a battery according to the first embodiment. The negative electrode 3 in the outermost layer has a configuration in which a negative electrode layer 3b is formed on one side which is the internal surface of a negative electrode current collector 3a as shown in FIG. 4. In the other portion of the negative electrode 3, the negative electrode layers 3b are formed on both surfaces of the negative electrode current collector 3a.

The positive electrode 5 includes a positive electrode current collector 5a and positive electrode layers 5b formed on both surfaces of the positive electrode current collector 5a.

As shown in FIG. 3, in the vicinity of the outer peripheral edge of the coiled electrode group 1, a negative electrode terminal 6 is connected to the negative electrode current collector 3a in the outermost negative electrode 3, and a positive electrode terminal 7 is connected to the positive electrode current collector 5a in the inside positive electrode 5. The negative electrode terminal 6 and the positive electrode terminal 7 are extended out from the opening of the bag-shaped container member 2.

The nonaqueous electrolyte battery 10 shown in FIGS. 3 and 4 can be produced according to the following procedure, for example. First, an electrode group 1 is produced. The electrode group 1 is then enclosed in a bag-shaped container member 2. In this case, one ends of a negative electrode terminal 6 and positive electrode terminal 7 are protruded toward the outside of the container member 2. Next, the circumference of the container member 2 is heat-sealed while a part thereof remains unsealed. Next, for example, a liquid nonaqueous electrolyte is injected via the opening of the bag-shaped container member 2 which is not heat-sealed. Finally, the opening is heat-sealed, and thereby the coiled electrode group 1 and the liquid state nonaqueous electrolyte are completely sealed.

Figure 5:
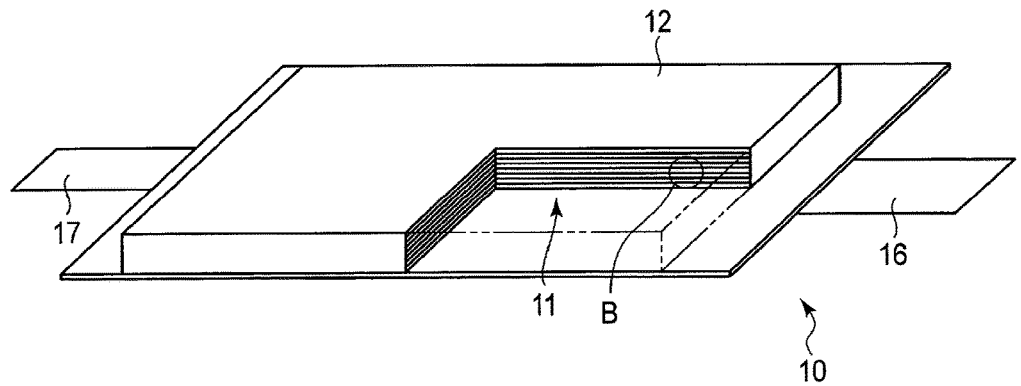
FIG. 5 is a partially cut perspective view schematically showing another flat-shaped nonaqueous electrolyte battery according to the second embodiment.
Figure 6:
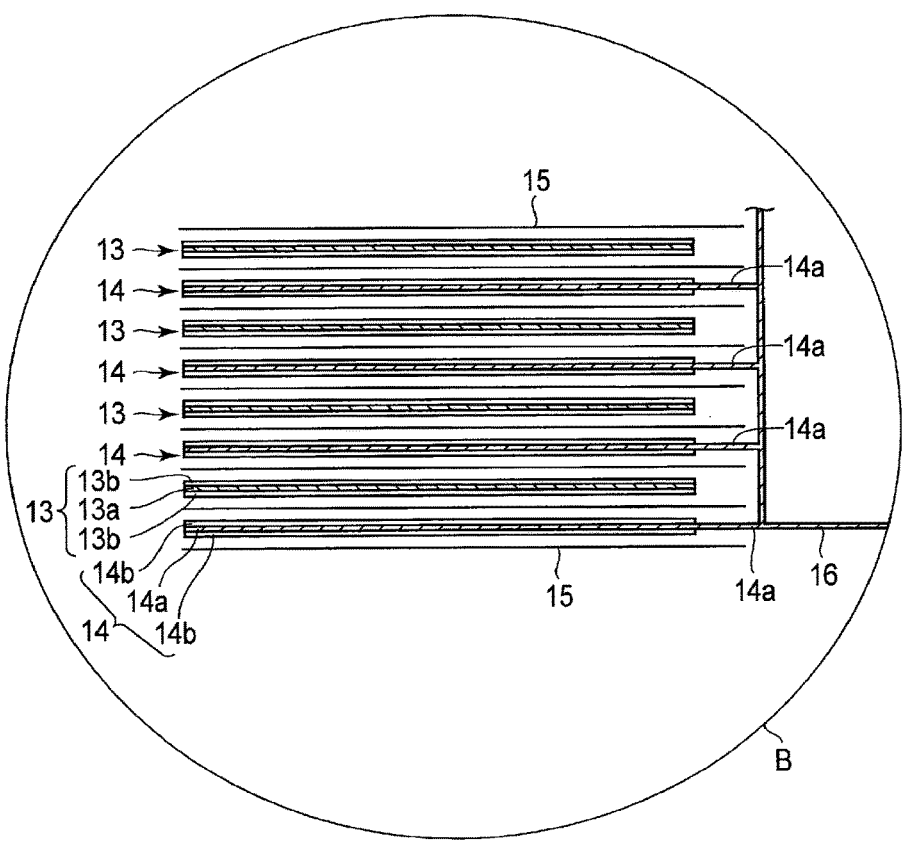
FIG. 6 is an enlarged sectional view of a B portion of FIG. 5.

The nonaqueous electrolyte battery according to the second embodiment is not limited to the nonaqueous electrolyte battery as an example shown in FIGS. 3 and 4, and may be, for example, a battery having a structure shown in FIGS. 5 and 6.

FIG. 5 is a partially cut perspective view schematically showing another flat-shaped nonaqueous electrolyte battery according to the second embodiment. FIG. 5 is a partially cut perspective view schematically showing another flat-shaped nonaqueous electrolyte battery according to the second embodiment.

A nonaqueous electrolyte battery 10 shown in FIGS. 5 and 6 includes an electrode group 11 shown in FIGS. 5 and 6, a container member 12 shown in FIG. 5, and a nonaqueous electrolyte (not shown). The electrode group 11 and the nonaqueous electrolyte are accommodated in the container member 12. The nonaqueous electrolyte is held in the electrode group 11.

The container member 12 is made of a laminate film including two resin layers and a metal layer sandwiched between the resin layers.

As shown in FIG. 6, the electrode group 11 is a stacked electrode group. As shown in FIG. 6, the stacked electrode group 11 has a structure in which positive electrodes 13 and negative electrodes 14 are alternately laminated with a sandwiched therebetween.

The electrode group 11 includes a plurality of positive electrodes 13. Each of the plurality of positive electrodes 13 includes a positive electrode current collector 13a, and a positive electrode layer 13b supported on each of the both surfaces of the positive electrode current collector 13a. The electrode group 11 includes a plurality of negative electrodes 14. Each of the plurality of negative electrodes 14 includes a negative electrode current collector 14a, and a negative electrode layer 14b supported on each of the both surfaces of the negative electrode current collector 14a. A part of the negative electrode current collector 14a of each of the negative electrodes 14 protrudes at one side from the negative electrode 14. The protruded part of the negative electrode current collector 14a is electrically connected to a strip-shaped negative electrode terminal 16. The tip of the strip-shaped negative electrode terminal 16 is extended out from the container member 12. Although not shown in the drawings, a part of the positive electrode current collector 13a of the positive electrode 13 protrudes from the positive electrode 13 at the side opposed to the protruded side of the negative electrode current collector 14a. The protruded part of the positive electrode current collector 13a from the positive electrode 13 is electrically connected to a strip-shaped positive electrode terminal 17. The tip of the strip-shaped positive electrode terminal 17 is opposed to the negative electrode terminal 16, and extended out from a side of the container member 12.

The nonaqueous electrolyte battery according to the second embodiment includes the negative electrode containing the active material for a battery according to the first embodiment. The nonaqueous electrolyte battery according to the second embodiment, accordingly, can exhibit excellent input-output characteristics and excellent cycle characteristics.

Third Embodiment

According to a third embodiment, there is provided a battery pack. The battery pack includes the nonaqueous electrolyte battery according to the second embodiment.

The battery pack according to the third embodiment can include one or more nonaqueous electrolyte batteries (unit cells) according to the second embodiment described above. The plurality of nonaqueous electrolyte batteries which may be included in the battery pack according to the third embodiment can be electrically connected to each other in series or parallel, to constitute a battery module. The battery pack according to the third embodiment may include a plurality of battery modules.

Next, a battery pack as an example according to the third embodiment will be described with reference to the drawings.

Figure 7:
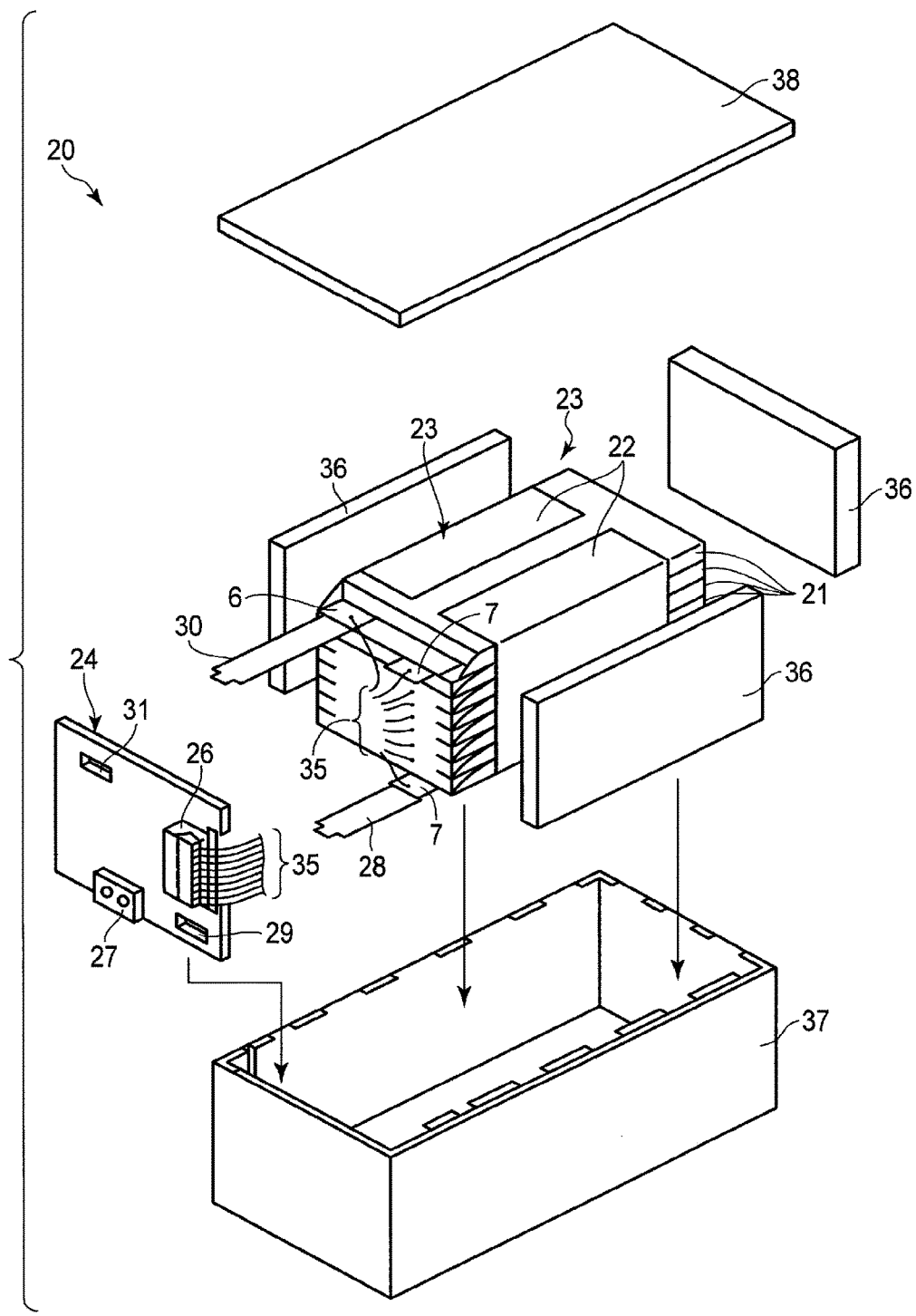
FIG. 7 is an exploded perspective view of a battery pack as an example according to a third embodiment.

FIG. 7 is an exploded perspective view of a battery pack as an example according to the third embodiment. FIG. 8 is a block diagram showing the electric circuit of the battery pack of FIG. 7.

A battery pack 20 shown in FIGS. 7 and 8 includes a plurality of unit cells 21. Each of the plurality of unit cells 21 is flat-type nonaqueous electrolyte battery 10 described with reference to FIGS. 3 and 4.

The plurality of unit cells 21 are stacked so that the negative electrode terminal 6 and the positive electrode terminal 7 extended outside are arranged in the same direction, and fastened with an adhesive tape 22 to constitute a battery module 23. The unit cells 21 are electrically connected to each other in series as shown in FIG. 8.

A printed wiring board 24 is arranged opposed to the side plane where the negative electrode terminal 6 and the positive electrode terminal 7 of the unit cell 21 are extended. A thermistor 25, a protective circuit 26, and an energizing terminal 27 to an external device are mounted on the printed wiring board 24, as shown in FIG. 8. An electric insulating plate (not shown) is attached to the surface of the printed wiring board 24 facing the battery module 23 to avoid unnecessary connection of the wires of the battery module 23.

A positive electrode-side lead 28 is connected to the positive electrode terminal 7 located at the bottom layer of the battery module 23 and the distal end of the lead 28 is inserted into a positive electrode-side connector 29 of the printed wiring board 24 so as to be electrically connected. An negative electrode-side lead 30 is connected to the negative electrode terminal 6 located at the top layer of the battery module 23 and the distal end of the lead 30 is inserted into an negative electrode-side connector 31 of the printed wiring board 24 so as to be electrically connected. The connectors 29 and 31 are connected to the protective circuit 26 through wirers 32 and 33 formed in the printed wiring board 24.

The thermistor 25 detects the temperature of the unit cells 21 and the detection signal is sent to the protective circuit 26. The protective circuit 26 can shut down a plus-side wirer 34a and a minus-side wirer 34b between the protective circuit 26 and the energizing terminal 27 to an external device under a predetermined condition. The predetermined condition indicates, for example, the case where the temperature detected by the thermistor 25 becomes a predetermined temperature or more. Another example of the predetermined condition indicates the case where the over-charge, over-discharge, or over-current of the unit cells 21 is detected. The detection of the over-charge and the like is performed on each of the unit cells 21 or the whole of the battery module 23. When each of the unit cells 21 is detected, the cell voltage may be detected, or positive electrode or negative electrode potential may be detected. In the case of the latter, a lithium electrode to be used as a reference electrode is inserted into each of the unit cells 21.

In the case of the battery pack 20 of FIGS. 7 and 8, wirers 35 for voltage detection are connected to each of the unit cells 21. Detection signals are sent to the protective circuit 26 through the wirers 35.

Protective sheets 36 including rubber or resin are arranged on three side planes of the battery module 23 except the side plane from which the positive electrode terminal 7 and the negative electrode terminal 6 are protruded.

The battery module 23 is housed in a housing container 37 together with each of the protective sheets 36 and the printed wiring board 24. That is, the protective sheets 36 are arranged on both internal surfaces in a long side direction and on one internal surface in a short side direction of the housing container 37. The printed wiring board 24 is arranged on the other internal surface in a short side direction. The battery module 23 is located in a space surrounded by the protective sheets 36 and the printed wiring board 24. A lid 38 is attached to the upper surface of the housing case 37.

In order to fix the battery module 23, a heat-shrinkable tape may be used in place of the adhesive tape 22. In this case, the battery module is bound by placing the protective sheets on the both sides of the battery module, revolving the heat-shrinkable tape, and thermally shrinking the heat-shrinkable tape.

In FIGS. 7 and 8, the structure in which the unit cells 21 are connected to each other in series is shown. In order to increase the battery capacity, the unit cells may be connected to each other in parallel. Furthermore, the assembled battery packs can be connected to each other in series and/or in parallel.

The aspect of the battery pack according to the third embodiment may be appropriately changed depending on its application. The applications of the battery pack according to the third embodiment are preferably those for which excellent cycle characteristics when large-current is taken out are desired. Specific examples of these applications include application as a battery of a digital camera and application to a vehicle such as a two- or four-wheeled hybrid electric vehicle, a two- or four-wheeled electric vehicle or a power-assisted bicycle. Particularly preferably, the battery pack according to the third embodiment is used for a battery mounted to a vehicle.

The battery pack according to the third embodiment includes the nonaqueous electrolyte battery according to the second embodiment. Therefore, the battery pack according to the third embodiment can exhibit excellent input-output characteristics and excellent cycle characteristics

EXAMPLES

Hereinafter, the above-mentioned embodiment will be described in more detail by reference to Examples. However, the present invention is not limited to the following Examples without departing from the spirit of the present invention.

Example 1

In Example 1, an active material of Example 1 was synthesized according to the following procedure.

First, a solution of titanyl sulfate in dilute sulfuric acid, a solution of niobium chloride in ethanol, and a solution of molybdenum chloride in ethanol were provided as starting materials. The solution of titanyl sulfate in dilute sulfuric acid had a Ti molar concentration of 1.28 mol/L. The solution of niobium chloride in ethanol had a Nb molar concentration of 0.5 mol/L. The solution of molybdenum chloride in ethanol had a Mo molar concentration of 0.5 mol/L.

Next, these solutions were mixed to obtain a transparent mixed solution having no precipitation of foreign material such as a hydroxide. The solutions were mixed so that a molar ratio Ti:Nb:Mo was set to 1.0:2.18:0.05.

Next, ammonia water was added dropwise to the mixed solution while the mixed solution was stirred, to adjust the pH of the solution to 8. By adding the ammonia water dropwise to the mixed solution, a white precipitated product was produced in the mixed solution. The precipitated product was taken out from the mixed solution, washed with pure water, subjected to a filtration and collected. Then, the precipitated product thus collected was dried at 80° C. in a heater. Then, the aggregation of the precipitated product was deflocculated in a planetary ball mill. Then, the precipitated product was fired in the air at 900° C. for 30 minutes to produce a fired product. In this case, a temperature-rising rate was set to 30° C./min. Then, the fired product obtained by firing was ground in a planetary ball mill to obtain powder. The powder was used as the active material of Example 1.

A small amount of the active material of Example 1 was weighed out, and subjected to acid dissolution and alkali dissolution to prepare a measurement solution. The measurement solution was subjected to ICP analysis (SPS-3520UV manufactured by SII Nano Technology Inc.) to calculate the amount of substance of each of elements (Ti, Nb, and Mo) per unit weight for the active material of Example 1. Meanwhile, a small amount of the active material of Example 1 was further weighed out to further prepare a measurement solution. The measurement solution was subjected to analysis according to an inactive gas-infrared absorption technique (TC-600 manufactured by LECO Corporation), to calculate the amount of substance of an O element per unit weight for the active material of Example 1. From these results, the molar percentage of each of constituent elements per unit weight for the active material of Example 1 was calculated. As a result, it was found that Ti=10.086 atm %, Nb=19.976 atm %, Mo=0.012 atm %, and O=69.926 atm %.

Figure 9:
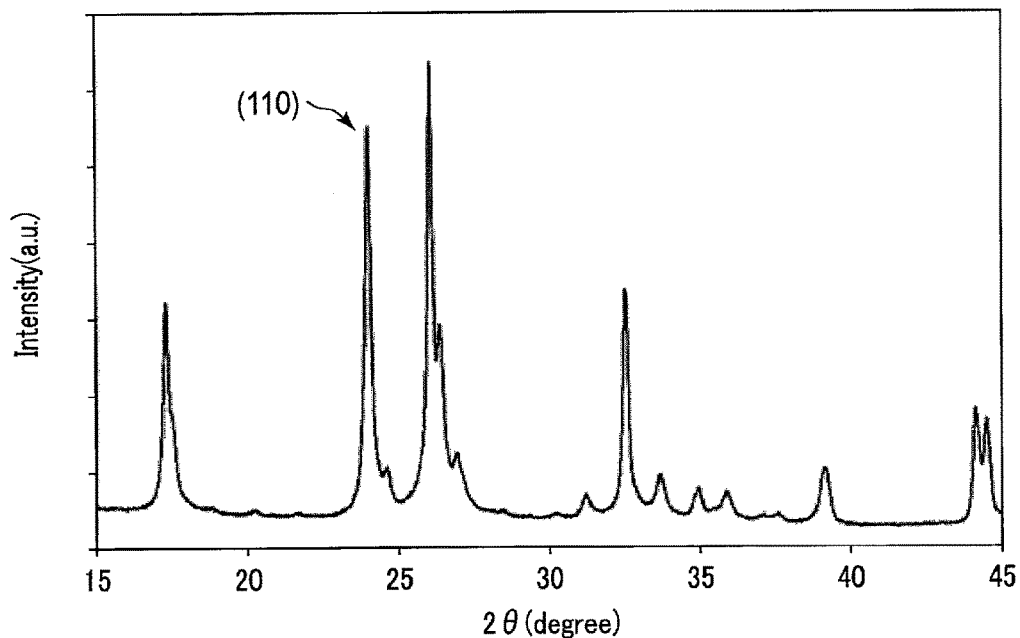
FIG. 9 shows a spectrum of an active material of Example 1 obtained by wide-angle X-ray diffraction measurement.

The powder of the active material of Example 1 was subjected to wide-angle X-ray diffraction measurement. The spectrum is shown in FIG. 9. It was confirmed that all peaks of the spectrum coincided with monoclinic $TiNb_2O_7$ (PDF: 01-077-1374) belonging to a space group of C2/m, and peaks of heterophases were not observed. The obtained spectrum was subjected to automatic profile processing using analysis software "Rigaku PDXL2 ver.2.1", to carry-out fitting. From the half-value width of a peak attributed to a (110) plane of the monoclinic $TiNb_2O_7$ (PDF: 01-077-1374) belonging to the space group of C2/m, the crystallite size was calculated using the Scherrer's equation as described in the above manner. As a result, it was found that the crystallite size of the active material particles contained in the active material of Example 1 was 30.1 nm.

Figure 10:
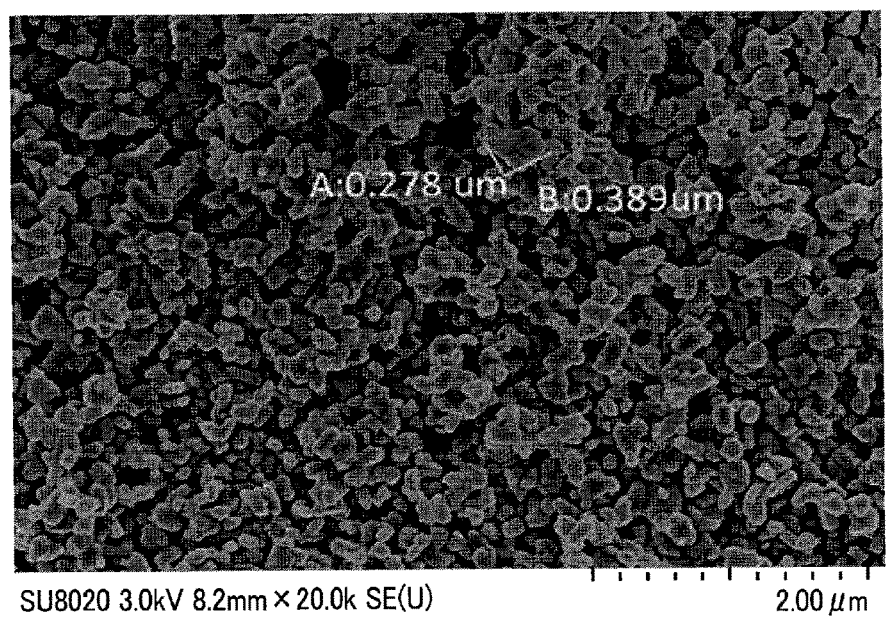
FIG. 10 shows a typical SEM image of the active material of Example 1.

The SEM image of the active material of Example 1 was obtained. SU-8020 manufactured by Hitachi High-Technologies Corporation was used as an apparatus. Specifically, a carbon tape was bonded on a sample table. Powder obtained by the tip of a cotton swab was lightly put on the carbon tape followed by pressure bonding. Superfluous powder was blown off by air, thereby obtaining a measurement sample. As observation conditions, an accelerating voltage of 3 kV, a probe condition of 10 µA, and a magnification ratio of 20,000 times were set. The typical SEM image is shown in FIG. 10. A primary particle having the highest aspect ratio was selected from the SEM image. The aspect ratio is a ratio B/A when the particle size of a primary particle in a direction in which the particle size is the shortest is defined as A, and the particle size of the primary particle in a direction in which the particle size is the longest is defined as B. In the SEM image of FIG. 10, the aspect ratio of a particle having the highest aspect ratio was 1.40. The same operation was carried out using 30 SEM images, and the average thereof was calculated as the aspect ratio for the primary particles of the active material particles contained in the active material of Example 1 (rounded off to two decimal places for calculation). As a result, it was found that the aspect ratio for the primary particles of the active material particles contained in the active material of Example 1 was 1.52.

Example 2

In Example 2, an active material of Example 2 was synthesized according to the same method as that of Example 1 except that a molar ratio Ti:Nb:Mo was set to 1.02:2.13:0.10 when starting materials were mixed to obtain a mixed solution.

The molar percentage of each of constituent elements per unit weight for the active material of Example 2 was calculated by the same method as that of Example 1. As a result, it was found that Ti=10.261 atm %, Nb=19.587 atm %, Mo=0.26 atm %, and O=69.892 atm %.

The active material of Example 2 was subjected to wide-angle X-ray diffraction measurement in the same manner as in Example 1. It was confirmed that all peaks of the spectrum coincided with monoclinic $TiNb_2O_7$ (PDF: 01-077-1374) belonging to a space group of C2/m, and peaks of heterophases were not observed. The obtained spectrum was subjected to fitting according to the same method as that of Example 1. From the half-value width of a peak attributed to a (110) plane of the monoclinic $TiNb_2O_7$ (PDF: 01-077-1374) belonging to the space group of C2/m, the crystallite size was calculated using the Scherrer's equation as described in the above manner. As a result, it was found that the crystallite size of the active material particles contained in the active material of Example 2 was 32.1 nm.

30 SEM images of the active material of Example 2 were obtained under the same observation conditions as those of Example 1. The average aspect ratio (rounded off to two decimal places for calculation) was calculated according to the same method as that of Example 1 from these SEM images. As a result, it was found that the aspect ratio for the primary particles of the active material particles contained in the active material of Example 2 was 1.55.

Example 3

In Example 3, an active material of Example 3 was synthesized according to the same method as that of Example 1 except that a molar ratio Ti:Nb:Mo was set to 1.05:2.07:0.15 when starting materials were mixed to obtain a mixed solution.

The molar percentage of each of constituent elements per unit weight for the active material of Example 3 was calculated by the same method as that of Example 1. As a result, it was found that Ti=10.435 atm %, Nb=18.883 atm %, Mo=1.113 atm %, and O=69.569 atm %.

The active material of Example 3 was subjected to wide-angle X-ray diffraction measurement in the same manner as in Example 1. It was confirmed that all peaks of the spectrum coincided with monoclinic $TiNb_2O_7$ (PDF: 01-077-1374) belonging to a space group of C2/m, and peaks of heterophases were not observed. The obtained spectrum was subjected to fitting according to the same method as that of Example 1. From the half-value width of a peak attributed to a (110) plane of the monoclinic $TiNb_2O_7$ (PDF: 01-077-1374) belonging to the space group of C2/m, the crystallite size was calculated using the Scherrer's equation as described in the above manner. As a result, it was found that the crystallite size of the active material particles contained in the active material of Example 3 was 38.9 nm.

30 SEM images of the active material of Example 3 were obtained under the same observation conditions as those of Example 1. The average aspect ratio (rounded off to two decimal places for calculation) was calculated according to the same method as that of Example 1 from these SEM images. As a result, it was found that the aspect ratio for the primary particles of the active material particles contained in the active material of Example 3 was 1.63.

Example 4

In Example 4, an active material of Example 4 was synthesized according to the same method as that of Example 1 except that a molar ratio Ti:Nb:Mo was set to 1.05:2.07:0.20 when starting materials were mixed to obtain a mixed solution.

The molar percentage of each of constituent elements per unit weight for the active material of Example 4 was calculated by the same method as that of Example 1. As a result, it was found that Ti=10.348 atm %, Nb=18.725 atm %, Mo=1.941 atm %, and O=68.986 atm %.

The active material of Example 4 was subjected to wide-angle X-ray diffraction measurement in the same manner as in Example 1. It was confirmed that all peaks of the spectrum coincided with monoclinic $TiNb_2O_7$ (PDF: 01-077-1374) belonging to a space group of C2/m, and peaks of heterophases were not observed. The obtained spectrum was subjected to fitting according to the same method as that of Example 1. From the half-value width of a peak attributed to a (110) plane of the monoclinic TiNb2O7 (PDF: 01-077-1374) belonging to the space group of C2/m, the crystallite size was calculated using the Scherrer's equation as described in the above manner. As a result, it was found that the crystallite size of the active material particles contained in the active material of Example 4 was 42.3 nm.

30 SEM images of the active material of Example 4 were obtained under the same observation conditions as those of Example 1. The average aspect ratio (rounded off to two decimal places for calculation) was calculated according to the same method as that of Example 1 from these SEM images. As a result, it was found that the aspect ratio for the primary particles of the active material particles contained in the active material of Example 4 was 1.71.

Example 5

In Example 5, an active material of Example 5 was synthesized according to the same method as that of Example 2 except that a firing temperature was set to 800° C.

The molar percentage of each of constituent elements per unit weight for the active material of Example 5 was calculated by the same method as that of Example 1. As a result, it was found that Ti=10.261 atm %, Nb=19.587 atm %, Mo=0.26 atm %, and O=69.892 atm %.

The active material of Example 5 was subjected to wide-angle X-ray diffraction measurement in the same manner as in Example 1. It was confirmed that all peaks of the spectrum coincided with monoclinic $TiNb_2O_7$ (PDF: 01-077-1374) belonging to a space group of C2/m, and peaks of heterophases were not observed. The obtained spectrum was subjected to fitting according to the same method as that of Example 1. From the half-value width of a peak attributed to a (110) plane of the monoclinic $TiNb_2O_7$ (PDF: 01-077-1374) belonging to the space group of C2/m, the crystallite size was calculated using the Scherrer's equation as described in the above manner. As a result, it was found that the crystallite size of the active material particles contained in the active material of Example 5 was 20.6 nm.

30 SEM images of the active material of Example 5 were obtained under the same observation conditions as those of Example 1. The average aspect ratio (rounded off to two decimal places for calculation) was calculated according to the same method as that of Example 1 from these SEM images. As a result, it was found that the aspect ratio for the primary particles of the active material particles contained in the active material of Example 5 was 1.42.

Example 6

In Example 6, an active material of Example 6 was synthesized according to the same method as that of Example 2 except that a firing temperature was set to 700° C.

The molar percentage of each of constituent elements per unit weight for the active material of Example 6 was calculated by the same method as that of Example 1. As a result, it was found that Ti=10.261 atm %, Nb=19.587 atm %, Mo=0.26 atm %, and O=69.892 atm %.

The active material of Example 6 was subjected to wide-angle X-ray diffraction measurement in the same manner as in Example 1. It was confirmed that all peaks of the spectrum coincided with monoclinic $TiNb_2O_7$ (PDF: 01-077-1374) belonging to a space group of C2/m, and peaks of heterophases were not observed. The obtained spectrum was subjected to fitting according to the same method as that of Example 1. From the half-value width of a peak attributed to a (110) plane of the monoclinic $TiNb_2O_7$ (PDF: 01-077-1374) belonging to the space group of C2/m, the crystallite size was calculated using the Scherrer's equation as described in the above manner. As a result, it was found that the crystallite size of the active material particles contained in the active material of Example 6 was 10.1 nm.

30 SEM images of the active material of Example 6 were obtained under the same observation conditions as those of Example 1. The average aspect ratio (rounded off to two decimal places for calculation) was calculated according to the same method as that of Example 1 from these SEM images. As a result, it was found that the aspect ratio for the primary particles of the active material particles contained in the active material of Example 6 was 1.21.

Example 7

In Example 7, an active material of Example 7 was synthesized according to the same method as that of Example 2 except that a temperature-rising rate during firing was set to 40 C/min.

The molar percentage of each of constituent elements per unit weight for the active material of Example 7 was calculated by the same method as that of Example 1. As a result, it was found that Ti=10.261 atm %, Nb=19.587 atm %, Mo=0.26 atm %, and O=69.892 atm %.

The active material of Example 7 was subjected to wide-angle X-ray diffraction measurement in the same manner as in Example 1. It was confirmed that all peaks of the spectrum coincided with monoclinic $TiNb_2O_7$ (PDF: 01-077-1374) belonging to a space group of C2/m, and peaks of heterophases were not observed. The obtained spectrum was subjected to fitting according to the same method as that of Example 1. From the half-value width of a peak attributed to a (110) plane of the monoclinic $TiNb_2O_7$ (PDF: 01-077-1374) belonging to the space group of C2/m, the crystallite size was calculated using the Scherrer's equation as described in the above manner. As a result, it was found that the crystallite size of the active material particles contained in the active material of Example 7 was 30.2 nm.

30 SEM images of the active material of Example 7 were obtained under the same observation conditions as those of Example 1. The average aspect ratio (rounded off to two decimal places for calculation) was calculated according to the same method as that of Example 1 from these SEM images. As a result, it was found that the aspect ratio for the primary particles of the active material particles contained in the active material of Example 7 was 1.21.

Example 8

In Example 8, an active material of Example 8 was synthesized according to the same method as that of Example 2 except that a temperature-rising rate during firing was set to 25° C./min.

The molar percentage of each of constituent elements per unit weight for the active material of Example 8 was calculated by the same method as that of Example 1. As a result, it was found that Ti=10.261 atm %, Nb=19.587 atm %, Mo=0.26 atm %, and O=69.892 atm %.

The active material of Example 8 was subjected to wide-angle X-ray diffraction measurement in the same manner as in Example 1. It was confirmed that all peaks of the spectrum coincided with monoclinic $TiNb_2O_7$ (PDF: 01-077-1374) belonging to a space group of C2/m, and peaks of heterophases were not observed. The obtained spectrum was subjected to fitting according to the same method as that of Example 1. From the half-value width of a peak attributed to a (110) plane of the monoclinic $TiNb_2O_7$ (PDF: 01-077-1374) belonging to the space group of C2/m, the crystallite size was calculated using the Scherrer's equation as described in the above manner. As a result, it was found that the crystallite size of the active material particles contained in the active material of Example 8 was 32.6 nm.

30 SEM images of the active material of Example 8 were obtained under the same observation conditions as those of Example 1. The average aspect ratio (rounded off to two decimal places for calculation) was calculated according to the same method as that of Example 1 from these SEM images. As a result, it was found that the aspect ratio for the primary particles of the active material particles contained in the active material of Example 8 was 2.65.

Example 9

In Example 9, an active material of Example 9 was synthesized according to the same method as that of Example 2 except that a temperature-rising rate during firing was set to 20° C./min.

The molar percentage of each of constituent elements per unit weight for the active material of Example 9 was calculated by the same method as that of Example 1. As a result, it was found that Ti=10.261 atm %, Nb=19.587 atm %, Mo=0.26 atm %, and O=69.892 atm %.

The active material of Example 9 was subjected to wide-angle X-ray diffraction measurement in the same manner as in Example 1. It was confirmed that all peaks of the spectrum coincided with monoclinic $TiNb_2O_7$ (PDF: 01-077-1374) belonging to a space group of C2/m, and peaks of heterophases were not observed. The obtained spectrum was subjected to fitting according to the same method as that of Example 1. From the half-value width of a peak attributed to a (110) plane of the monoclinic $TiNb_2O_7$ (PDF: 01-077-1374) belonging to the space group of C2/m, the crystallite size was calculated using the Scherrer's equation as described in the above manner. As a result, it was found that the crystallite size of the active material particles contained in the active material of Example 9 was 29.5 nm.

30 SEM images of the active material of Example 9 were obtained under the same observation conditions as those of Example 1. The average aspect ratio (rounded off to two decimal places for calculation) was calculated according to the same method as that of Example 1 from these SEM images. As a result, it was found that the aspect ratio for the primary particles of the active material particles contained in the active material of Example 9 was 3.82.

Example 10

In Example 10, an active material of Example 10 was synthesized according to the following procedure.

First, a solution of titanyl sulfate in dilute sulfuric acid, a solution of niobium chloride in ethanol, and a solution of tungsten chloride in ethanol were provided as starting materials. The solution of titanyl sulfate in dilute sulfuric acid had a Ti molar concentration of 1.28 mol/L. The solution of niobium chloride in ethanol had a Nb molar concentration of 0.5 mol/L. The solution of tungsten chloride in ethanol had a W molar concentration of 0.5 mol/L.

Next, these solutions were mixed to obtain a transparent mixed solution having no precipitation of foreign material such as a hydroxide. The solutions were mixed so that a molar ratio Ti:Nb:W was set to 1.0:2.18:0.02.

Next, ammonia water was added dropwise to the mixed solution while the mixed solution was stirred, to adjust the pH of the solution to 8. By adding the ammonia water dropwise to the mixed solution, a white precipitated product was produced in the mixed solution. The precipitated product was taken out from the mixed solution, washed with pure water, subjected to a filtration and collected. Then, the precipitated product thus collected was dried at 80° C. in a heater. Then, the aggregation of the precipitated product was deflocculated in a planetary ball mill. Then, the precipitated product was fired in the air at 900° C. for 30 minutes to produce a fired product. In this case, a temperature-rising rate was set to 30° C./min. Then, the fired product obtained by firing was ground in a planetary ball mill to obtain powder. The powder was used as the active material of Example 10.

A small amount of the active material of Example 10 was weighed out, and subjected to acid dissolution and alkali dissolution to prepare a measurement solution. The measurement solution was subjected to ICP analysis (SPS-3520UV manufactured by SII Nano Technology Inc.) to calculate the amount of substance of each of elements (Ti, Nb, and W) per unit weight for the active material of Example 10. Meanwhile a small amount of the active material of Example 10 was further weighed out to further prepare a measurement solution. The measurement solution was subjected to analysis according to an inactive gas-infrared absorption technique (TC-600 manufactured by LECO Corporation), to calculate the amount of substance of an O element per unit weight for the active material of Example 10. From these results, the molar percentage of each of constituent elements per unit weight for the active material of Example 10 was calculated. As a result, it was found that Ti=10.09 atm %, Nb=19.978 atm %, W=0.011 atm %, and O=69.921 atm %.

The powder active material of Example 10 was subjected to wide-angle X-ray diffraction measurement in the same manner as in Example 1. It was confirmed that all peaks of the spectrum coincided with monoclinic $TiNb_2O_7$ (PDF: 01-077-1374) belonging to a space group of C2/m, and peaks of heterophases were not observed. The obtained spectrum was subjected to fitting according to the same method as that of Example 1. From the half-value width of a peak attributed to a (110) plane of the monoclinic $TiNb_2O_7$ (PDF: 01-077-1374) belonging to the space group of C2/m, the crystallite size was calculated using the Scherrer's equation as described in the above manner. As a result, it was found that the crystallite size of the active material particles contained in the active material of Example 10 was 29.5 nm.

30 SEM images of the active material of Example 10 were obtained under the same observation conditions as those of Example 1. The average aspect ratio (rounded off to two decimal places for calculation) was calculated according to the same method as that of Example 1 from these SEM images. As a result, it was found that the aspect ratio for the primary particles of the active material particles contained in the active material of Example 10 was 1.58.

Example 11

In Example 11, an active material of Example 11 was synthesized according to the same method as that of Example 10 except that a molar ratio Ti:Nb:W was set to 1.04:2.1:0.05 when starting materials were mixed to obtain a mixed solution.

The molar percentage of each of constituent elements per unit weight for the active material of Example 11 was calculated by the same method as that of Example 1. As a result, it was found that Ti=10.47 atm %, Nb=19.161 atm %, W=0.47 atm %, and O=69.899 atm %.

The active material of Example 11 was subjected to wide-angle X-ray diffraction measurement in the same manner as in Example 1. It was confirmed that all peaks of the spectrum coincided with monoclinic $TiNb_2O_7$ (PDF: 01-077-1374) belonging to a space group of C2/m, and peaks of heterophase were not observed. The obtained spectrum was subjected to fitting according to the same method as that of Example 1. From the half-value width of a peak attributed to a (110) plane of the monoclinic $TiNb2O7$ (PDF: 01-077-1374) belonging to the space group of C2/m, the crystallite size was calculated using the Scherrer's equation as described in the above manner. As a result, it was found that the crystallite size of the active material particles contained in the active material of Example 11 was 31.9 nm.

30 SEM images of the active material of Example 11 were obtained under the same observation conditions as those of Example 1. The average aspect ratio (rounded off to two decimal places for calculation) was calculated according to the same method as that of Example 1 from these SEM images. As a result, it was found that the aspect ratio for the primary particles of the active material particles contained in the active material of Example 11 was 1.62.

Example 12

In Example 12, an active material of Example 12 was synthesized according to the same method as that of Example 10 except that a molar ratio Ti:Nb:W was set to 1.04:2.1:0.05 when starting materials were mixed to obtain a mixed solution.

The molar percentage of each of constituent elements per unit weight for the active material of Example 12 was calculated by the same method as that of Example 1. As a result, it was found that Ti=10.36 atm %, Nb=18.752 atm %, W=1.796 atm %, and O=69.088 atm %.

The active material of Example 12 was subjected to wide-angle X-ray diffraction measurement in the same manner as in Example 1. It was confirmed that all peaks of the spectrum coincided with monoclinic $TiNb_2O_7$ (PDF: 01-077-1374) belonging to a space group of C2/m, and peaks of heterophases were not observed. The obtained spectrum was subjected to fitting according to the same method as that of Example 1. From the half-value width of a peak attributed to a (110) plane of the monoclinic $TiNb_2O_7$ (PDF: 01-077-1374) belonging to the space group of C2/m, the crystallite size was calculated using the Scherrer's equation as described in the above manner. As a result, it was found that the crystallite size of the active material particles contained in the active material of Example 12 was 34.7 nm.

30 SEM images of the active material of Example 12 were obtained under the same observation conditions as those of Example 1. The average aspect ratio (rounded off to two decimal places for calculation) was calculated according to the same method as that of Example 1 from these SEM images. As a result, it was found that the aspect ratio for the primary particles of the active material particles contained in the active material of Example 12 was 1.83.

Example 13

In Example 13, an active material of Example 13 was synthesized according to the following procedure.

First, a solution of titanyl sulfate in dilute sulfuric acid, a solution of niobium chloride in ethanol, and a solution of vanadium trichloride oxide in ethanol were provided as starting materials. The solution of titanyl sulfate in dilute sulfuric acid had a Ti molar concentration of 1.28 mol/L. The solution of niobium chloride in ethanol had a Nb molar concentration of 0.5 mol/L. The solution of vanadium trichloride oxide in ethanol had a V molar concentration of 0.5 mol/L.

Next, these solutions were mixed to obtain a transparent mixed solution having no precipitation of foreign material such as a hydroxide. The solutions were mixed so that a molar ratio Ti:Nb:V was set to 1.0:2.15:0.06.

Next, ammonia water was added dropwise to the mixed solution while the mixed solution was stirred, to adjust the pH of the solution to 8. By adding the ammonia water dropwise to the mixed solution, a white precipitated product was produced in the mixed solution.

Because vanadium trichloride oxide as one of starting materials has high reactivity with water, from the mixing of the starting materials to the formation of the white precipitated product described above, these procedures were performed under a dew point condition of −30° C. dp.

The precipitated product was taken out from the mixed solution, and washed with pure water, subjected to a filtration, and corrected. Then, the precipitated product thus obtained was dried at 80° C. in a heater. Then, the aggregation of the precipitated product was deflocculated in a planetary ball mill. Then, the precipitated product was fired in the air at 900° C. for 30 minutes to produce a fired product. In this case, a temperature-rising rate was set to 30° C./min. Then, the fired product obtained by firing was ground in a planetary ball mill to obtain powder. The powder was used as the active material of Example 13.

A small amount of the active material of Example 13 was weighed out, and subjected to acid dissolution and alkali dissolution to prepare a measurement solution. The measurement solution was subjected to ICP analysis (SPS-3520UV manufactured by SII Nano Technology Inc.) to calculate the amount of substance of each of elements (Ti, Nb, and V) per unit weight for the active material of Example 13. Meanwhile, a small amount of the active material of Example 13 was further weighed out to further prepare a measurement solution. The measurement solution was subjected to analysis according to an inactive gas-infrared absorption technique (TC-600 manufactured by LECO Corporation), to calculate the amount of substance of an O element per unit weight for the active material of Example 13. The molar percentage of each of constituent elements per unit weight for the active material of Example 13 was calculated from these results. As a result, it was found that Ti=9.99 atm %, Nb=19.987 atm %, V=0.013 atm %, and O=70.01 atm %.

The active material of Example 13 was subjected to wide-angle X-ray diffraction measurement in the same manner as in Example 1. It was confirmed that all peaks of the spectrum coincided with monoclinic $TiNb_2O_7$ (PDF: 01-077-1374) belonging to a space group of C2/m, and peaks of heterophases were not observed. The obtained spectrum was subjected to fitting according to the same method as that of Example 1. From the half-value width of a peak attributed to a (110) plane of the monoclinic $TiNb_2O_7$ (PDF: 01-077-1374) belonging to the space group of C2/m, the crystallite size was calculated using the Scherrer's equation as described in the above manner. As a result, it was found that the crystallite size of the active material particles contained in the active material of Example 13 was 31.6 nm.

30 SEM images of the active material of Example 13 were obtained under the same observation conditions as those of Example 1. The average aspect ratio (rounded off to two decimal places for calculation) was calculated according to the same method as that of Example 1 from these SEM images. As a result, it was found that the aspect ratio for the primary particles of the active material particles contained in the active material of Example 13 was 1.32.

Example 14

In Example 14, an active material of Example 14 was synthesized according to the same method as that of Example 13 except that a molar ratio Ti:Nb:V was set to 1.0:2.12:0.10 when starting materials were mixed to obtain a mixed solution.

The molar percentage of each of constituent elements per unit weight for the active material of Example 14 was calculated by the same method as that of Example 1. As a result, it was found that Ti=10.02 atm %, Nb=19.4 atm %, V=0.60 atm %, and O=69.98 atm %.

The active material of Example 14 was subjected to wide-angle X-ray diffraction measurement in the same manner as in Example 1. It was confirmed that all peaks of the spectrum coincided with monoclinic $TiNb_2O_7$ (PDF: 01-077-1374) belonging to a space group of C2/m, and peaks of heterophases were not observed. The obtained spectrum was subjected to fitting according to the same method as that of Example 1. From the half-value width of a peak attributed to a (110) plane of the monoclinic $TiNb_2O_7$ (PDF: 01-077-1374) belonging to the space group of C2/m, the crystallite size was calculated using the Scherrer's equation as described in the above manner. As a result, it was found that the crystallite size of the active material particles contained in the active material of Example 14 was 33.3 nm.

30 SEM images of the active material of Example 14 were obtained under the same observation conditions as those of Example 1. The average aspect ratio (rounded off to two decimal places for calculation) was calculated according to the same method as that of Example 1 from these SEM images. As a result, it was found that the aspect ratio for the primary particles of the active material particles contained in the active material of Example 14 was 1.44.

Example 15

In Example 15, an active material of Example 15 was synthesized according to the same method as that of Example 13 except that a molar ratio Ti:Nb:V was set to 1.0:2.0:0.15 when starting materials were mixed to obtain a mixed solution.

The molar percentage of each of constituent elements per unit weight for the active material of Example 15 was calculated by the same method as that of Example 1. As a result, it was found that Ti=9.907 atm %, Nb=18.823 atm %, V=1.922 atm %, and O=69.348 atm %.

The active material of Example 15 was subjected to wide-angle X-ray diffraction measurement in the same manner as in Example 1. It was confirmed that all peaks of the spectrum coincided with monoclinic $TiNb_2O_7$ (PDF: 01-077-1374) belonging to a space group of C2/m, and peaks of heterophases were not observed. The obtained spectrum was subjected to fitting according to the same method as that of Example 1. From the half-value width of a peak attributed to a (110) plane of the monoclinic $TiNb_2O_7$ (PDF: 01-077-1374) belonging to the space group of C2/m, the crystallite size was calculated using the Scherrer's equation as described in the above manner. As a result, it was found that the crystallite size of the active material particles contained in the active material of Example 15 was 43.1 nm.

30 SEM images of the active material of Example 15 were obtained under the same observation conditions as those of Example 1. The average aspect ratio (rounded off to two decimal places for calculation) was calculated according to the same method as that of Example 1 from these SEM images. As a result, it was found that the aspect ratio for the primary particles of the active material particles contained in the active material of Example 15 was 1.59.

Comparative Example 1

In Comparative Example 1, $TiNb_2O_7$ as an active material of Comparative Example 1 was synthesized by a solid-phase method described below.

First, titanium oxide powder, niobium oxide powder, and molybdenum oxide powder were provided. These powders were weighed so that a molar ratio Ti:Nb:Mo was set to 1.05:1.9:0.08. The powders were wet-blended in a planetary ball mill to obtain a mixture. Ethanol was used as a solvent. The obtained mixture was taken out, dried at 80° C. in a heater, to evaporate the solvent from the mixture. Then, the mixture was subjected to pre-sintering in air atmosphere at 1000° C. for 12 hours to produce a pre-sintered product. Then, the pre-sintered product was naturally cooled. Then, the temporarily fired product was put into the planetary ball mill again for grinding and mixing, to obtain a precursor. The precursor was subjected to a heat treatment at 1000° C. for 12 hours. Then, the fired product was ground in the planetary ball mill again, to deflocculate coarse particles. Thus, active material powder of Comparative Example 1 was obtained.

The molar percentage of each of constituent elements per unit weight for the active material of Comparative Example 1 was calculated by the same method as that of Example 1. As a result, it was found that Ti=10.498 atm %, Nb=18.996 atm %, Mo=0.520 atm %, and O=69.986 atm %.

Figure 11:
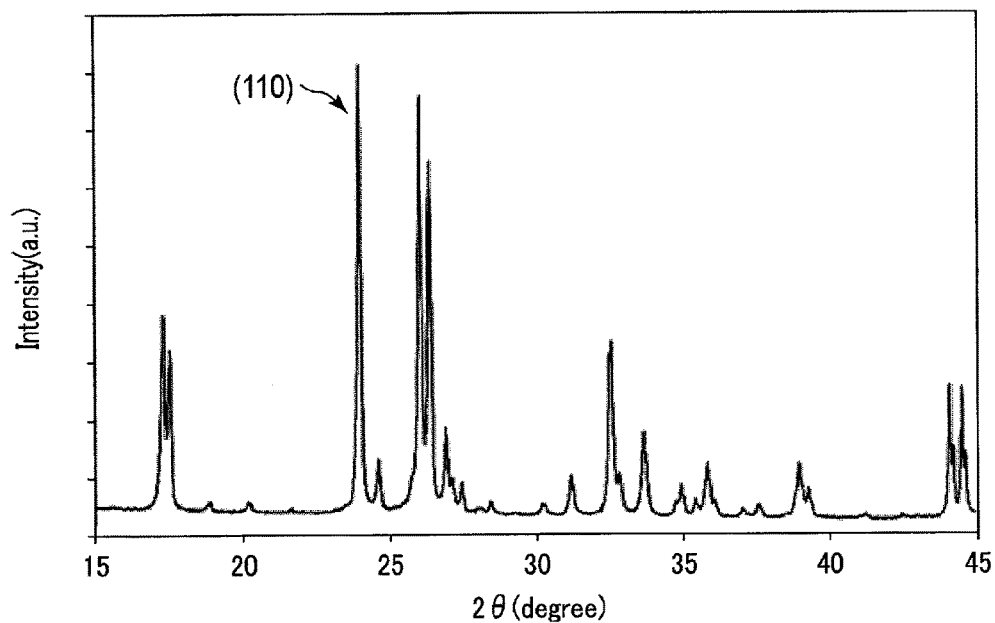
FIG. 11 shows a spectrum of an active material of Comparative Example 1 obtained by wide-angle X-ray diffraction measurement.

The active material of Comparative Example 1 was subjected to wide-angle X-ray diffraction measurement in the same manner as in Example 1. The spectrum is shown in FIG. 11. It was confirmed that all peaks of the spectrum coincided with monoclinic $TiNb_2O_7$ (PDF: 01-077-1374) belonging to a space group of C2/m, and peaks of heterophases were not observed. The obtained spectrum was subjected to fitting according to the same method as that of Example 1. From the half-value width of a peak attributed to a (110) plane of the monoclinic $TiNb_2O_7$ (PDF: 01-077-1374) belonging to the space group of C2/m, the crystallite size was calculated using the Scherrer's equation as described in the above manner. As a result, it was found that the crystallite size of the active material particles contained in the active material of Comparative Example 1 was 85.3 nm.

Figure 12:
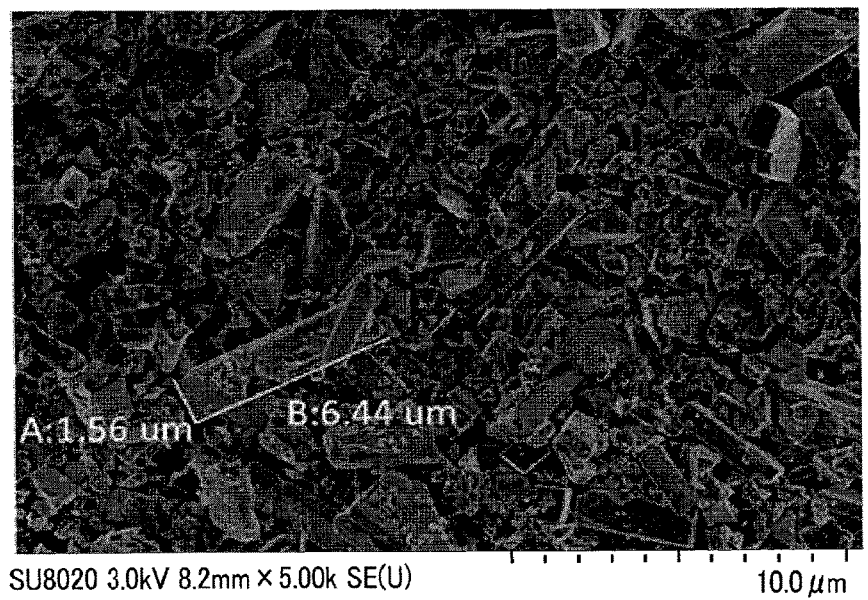
FIG. 12 shows a typical SEM image of the active material of Comparative Example 1.

30 SEM images of the active material of Comparative Example 1 were obtained in the same manner as in Example 1 except that a magnification ratio was set to 5,000 times. The typical SEM image is shown in FIG. 12. From here, a primary particle having the largest particle size was selected, the aspect ratio for the selected primary particle was calculated. As a result, it was found that the aspect ratio of the selected primary particle was 4.13. The same operation was carried out using the 30 SEM images, and the average thereof was calculated as the aspect ratio for the primary particles of the active material particles contained in the active material of Comparative Example 1 (rounded off to two decimal places for calculation). As a result, it was found that the aspect ratio for the primary particles of the active material particles contained in the active material of Comparative Example 1 was 4.50.

Comparative Example 2

In Comparative Example 2, an active material of Comparative Example 2 was synthesized according to the same method as that of Comparative Example 1 except that tungstic oxide powder was used in place of molybdenum oxide powder, and titanium oxide powder, niobium oxide powder, and tungstic oxide powder were weighed so that a molar ratio Ti:Nb:W was set to 1.05:1.9:0.05.

The molar percentage of each of constituent elements per unit weight for the active material of Comparative Example 2 was calculated by the same method as that of Example 1. As a result, it was found that Ti=10.508 atm %, Nb=19.02 atm %, W=0.490 atm %, and O=69.982 atm %.

The active material of Comparative Example 2 was subjected to wide-angle X-ray diffraction measurement in the same manner as in Example 1. It was confirmed that all peaks of the spectrum coincided with monoclinic $TiNb_2O_7$ (PDF: 01-077-1374) belonging to a space group of C2/m, and peaks of heterophases were not observed. The obtained spectrum was subjected to fitting according to the same method as that of Example 1. From the half-value width of a peak attributed to a (110) plane of the monoclinic $TiNb_2O_7$ (PDF: 01-077-1374) belonging to the space group of C2/m, the crystallite size was calculated using the Scherrer's equation as described in the above manner. As a result, it was found that the crystallite size of the active material particles contained in the active material of Comparative Example 2 was 90.5 nm.

30 SEM images of the active material of Comparative Example 2 were obtained under the same observation conditions as those of Comparative Example 1. The average aspect ratio (rounded off to two decimal places for calculation) was calculated according to the same method as that of Example 1 from these SEM images. As a result, it was found that the aspect ratio for the primary particles of the active material particles contained in the active material of Comparative Example 2 was 4.23.

Comparative Example 3

In Comparative Example 3, an active material of Comparative Example 3 was synthesized according to the same method as that of Comparative Example 1 except that vanadium oxide powder was used in place of molybdenum oxide powder, and titanium oxide powder, niobium oxide powder, and vanadium oxide powder were weighed so that a molar ratio Ti:Nb:V was set to 1.0:1.95:0.10.

The molar percentage of each of constituent elements per unit weight for the active material of Comparative Example 3 was calculated by the same method as that of Example 1. As a result, it was found that Ti=9.968 atm %, Nb=19.49 atm %, V=0.510 atm %, and O=70.032 atm %.

The active material of Comparative Example 3 was subjected to wide-angle X-ray diffraction measurement in the same manner as in Example 1. It was confirmed that all peaks of the spectrum coincided with monoclinic $TiNb_2O_7$ (PDF: 01-077-1374) belonging to a space group of C2/m, and peaks of heterophases were not observed. The obtained spectrum was subjected to fitting according to the same method as that of Example 1. From the half-value width of a peak attributed to a (110) plane of the monoclinic $TiNb_2O_7$ (PDF: 01-077-1374) belonging to the space group of C2/m, the crystallite size was calculated using the Scherrer's equation as described in the above manner. As a result, it was found that the crystallite size of the active material particles contained in the active material of Comparative Example 3 was 88.9 nm.

30 SEM images of the active material of Comparative Example 3 were obtained under the same observation conditions as those of Comparative Example 1. The average aspect ratio (rounded off to two decimal places for calculation) was calculated according to the same method as that of Example 1 from these SEM images. As a result, it was found that the aspect ratio for the primary particles of the active material particles contained in the active material of Comparative Example 3 was 4.81.

Comparative Example 4

In Comparative Example 4, an active material was synthesized according to the same method as that of Example 2 except that a firing temperature was set to 1000° C.

The molar percentage of each of constituent elements per unit weight for the active material of Comparative Example 4 was calculated by the same method as that of Example 1.

As a result, it was found that Ti=10.261 atm %, Nb=19.587 atm %, Mo=0.26 atm %, and O=69.892 atm %.

The active material of Comparative Example 4 was subjected to wide-angle X-ray diffraction measurement in the same manner as in Example 1. It was confirmed that all peaks of the spectrum coincided with monoclinic $TiNb_2O_7$ (PDF: 01-077-1374) belonging to a space group of C2/m, and peaks of heterophases were not observed. The obtained spectrum was subjected to fitting according to the same method as that of Example 1. From the half-value width of a peak attributed to a (110) plane of the monoclinic $TiNb_2O_7$ (PDF: 01-077-1374) belonging to the space group of C2/m, the crystallite size was calculated using the Scherrer's equation as described in the above manner. As a result, it was found that the crystallite size of the active material particles contained in the active material of Comparative Example 4 was 92.1 nm.

30 SEM images of the active material of Comparative Example 4 were obtained under the same observation conditions as those of Comparative Example 1. The average aspect ratio (rounded off to two decimal places for calculation) was calculated according to the same method as that of Example 1 from these SEM images. As a result, it was found that the aspect ratio for the primary particles of the active material particles contained in the active material of Comparative Example 4 was 3.84.

Comparative Example 5

In Comparative Example 5, an active material of Comparative Example 5 was synthesized according to the same method as that of Example 2 except that a firing temperature was set to 600° C.

The molar percentage of each of constituent elements per unit weight for the active material of Comparative Example 5 was calculated by the same method as that of Example 1. As a result, it was found that Ti=10.261 atm %, Nb=19.587 atm %, Mo=0.26 atm %, and O=69.892 atm %.

The active material of Comparative Example 5 was subjected to wide-angle X-ray diffraction measurement in the same manner as in Example 1. It was confirmed that all peaks of the spectrum coincided with monoclinic $TiNb_2O_7$ (PDF: 01-077-1374) belonging to a space group of C2/m, and peaks of heterophases were not observed. The obtained spectrum was subjected to fitting according to the same method as that of Example 1. From the half-value width of a peak attributed to a (110) plane of the monoclinic $TiNb_2O_7$ (PDF: 01-077-1374) belonging to the space group of C2/m, the crystallite size was calculated using the Scherrer's equation as described in the above manner. As a result, it was found that the crystallite size of the active material particles contained in the active material of Comparative Example 5 was 4.84 nm.

30 SEM images of the active material of Comparative Example 5 were obtained under the same observation conditions as those of Comparative Example 1. The average aspect ratio (rounded off to two decimal places for calculation) was calculated according to the same method as that of Example 1 from these SEM images. As a result, it was found that the aspect ratio for the primary particles of the active material particles contained in the active material of Comparative Example 5 was 1.12.

Comparative Example 6

In Comparative Example 6, an active material of Comparative Example 6 was synthesized according to the same method as that of Example 2 except that a temperature-rising rate during firing was set to 5° C./min.

The molar percentage of each of constituent elements per unit weight for the active material of Comparative Example 6 was calculated by the same method as that of Example 1. As a result, it was found that Ti=10.261 atm, Nb=19.587 atm, Mo=0.26 atm %, and O=69.892 atm %.

The active material of Comparative Example 6 was subjected to wide-angle X-ray diffraction measurement in the same manner as in Example 1. It was confirmed that all peaks of the spectrum coincided with monoclinic $TiNb_2O_7$ (PDF: 01-077-1374) belonging to a space group of C2/m, and peaks of heterophases were not observed. The obtained spectrum was subjected to fitting according to the same method as that of Example 1. From the half-value width of a peak attributed to a (110) plane of the monoclinic $TiNb_2O_7$ (PDF: 01-077-1374) belonging to the space group of C2/m, the crystallite size was calculated using the Scherrer's equation as described in the above manner. As a result, it was found that the crystallite size of the active material particles contained in the active material of Comparative Example 6 was 56.1 nm.

30 SEM images of the active material of Comparative Example 6 were obtained under the same observation conditions as those of Comparative Example 1. The average aspect ratio (rounded off to two decimal places for calculation) was calculated according to the same method as that of Example 1 from these SEM images. As a result, it was found that the aspect ratio for the primary particles of the active material particles contained in the active material of Comparative Example 6 was 4.21.

Comparative Example 7

In Comparative Example 7, an active material of Comparative Example 7 was synthesized according to the same method as that of Example 2 except that a temperature-rising rate during firing was set to 5° C./min, and a firing temperature was set to 1000° C.

The molar percentage of each of constituent elements per unit weight for the active material of Comparative Example 7 was calculated by the same method as that of Example 1. As a result, it was found that Ti=10.261 atm %, Nb=19.587 atm %, Mo=0.26 atm %, and O=69.892 atm %.

The active material of Comparative Example 7 was subjected to wide-angle X-ray diffraction measurement in the same manner as in Example 1. It was confirmed that all peaks of the spectrum coincided with monoclinic $TiNb_2O_7$ (PDF: 01-077-1374) belonging to a space group of C2/m, and peaks of heterophase were not observed. The obtained spectrum was subjected to fitting according to the same method as that of Example 1. From the half-value width of a peak attributed to a (110) plane of the monoclinic $TiNb_2O_7$ (PDF: 01-077-1374) belonging to the space group of C2/m, the crystallite size was calculated using the Scherrer's equation as described in the above manner. As a result, it was found that the crystallite size of the active material particles contained in the active material of Comparative Example 7 was 85.4 nm.

30 SEM images of the active material of Comparative Example 7 were obtained under the same observation conditions as those of Comparative Example 1. The average aspect ratio (rounded off to two decimal places for calculation) was calculated according to the same method as that of Example 1 from these SEM images. As a result, it was found that the aspect ratio for the primary particles of the active material particles contained in the active material of Comparative Example 7 was 4.88.

Comparative Example 8

In Comparative Example 8, an active material of Comparative Example 8 was synthesized according to the same method as that of Example 1 except that a molar ratio Ti:Nb:Mo was set to 1.03:2.02:0.4 when starting materials were mixed to obtain a mixed solution.

The molar percentage of each of constituent elements per unit weight for the active material of Comparative Example 8 was calculated by the same method as that of Example 1. As a result, it was found that Ti=10.327 atm %, Nb=18.686 atm %, Mo=0.214 atm %, and O=68.843 atm %.

The active material of Comparative Example 8 was subjected to wide-angle X-ray diffraction measurement in the same manner as in Example 1. A part of peaks of the spectrum coincided with monoclinic TiNb2O7 (PDF: 01-077-1374) belonging to a space group of C2/m. However, peaks of heterophases were observed. The obtained spectrum was subjected to fitting according to the same method as that of Example 1. From the half-value width of a peak attributed to a (110) plane of the monoclinic $TiNb_2O_7$ (PDF: 01-077-1374) belonging to the space group of C2/m, the crystallite size was calculated using the Scherrer's equation as described in the above manner. As a result, it was found that the crystallite size of the active material particles contained in the active material of Comparative Example 8 was 51.5 nm.

30 SEM images of the active material of Comparative Example 8 were obtained under the same observation conditions as those of Example 1. The average aspect ratio (rounded off to two decimal places for calculation) was calculated according to the same method as that of Example 1 from these SEM images. As a result, it was found that the aspect ratio for the primary particles of the active material particles contained in the active material of Comparative Example 8 was 1.96.

Comparative Example 9

In Comparative Example 9, an active material of Comparative Example 9 was synthesized according to the same method as that of Example 1 except that a molar ratio Ti:Nb:Mo was set to 1.03:2.02:0.03 when starting materials were mixed to obtain a mixed solution.

The molar percentage of each of constituent elements per unit weight for the active material of Comparative Example 9 was calculated by the same method as that of Example 1. As a result, it was found that Ti=10.0 atm %, Nb=20.0 atm %, Mo=0.006 atm %, and O=69.994%.

The active material of Comparative Example 9 was subjected to wide-angle X-ray diffraction measurement in the same manner as in Example 1. It was confirmed that all peaks of the spectrum coincided with monoclinic $TiNb_2O_7$ (PDF: 01-077-1374) belonging to a space group of C2/m, and peaks of heterophases were not observed. The obtained spectrum was subjected to fitting according to the same method as that of Example 1. From the half-value width of a peak attributed to a (110) plane of the monoclinic $TiNb_2O_7$ (PDF: 01-077-1374) belonging to the space group of C2/m, the crystallite size was calculated using the Scherrer's equation as described in the above manner. As a result, it was found that the crystallite size of the active material particles contained in the active material of Comparative Example 9 was 29.9 nm.

30 SEM images of the active material of Comparative Example 9 were obtained under the same observation conditions as those of Example 1. The average aspect ratio (rounded off to two decimal places for calculation) was calculated according to the same method as that of Example 1 from these SEM images. As a result, it was found that the aspect ratio for the primary particles of the active material particles contained in the active material of Comparative Example 9 was 1.21.

Comparative Example 10

In Comparative Example 10, an active material of Comparative Example 10 was synthesized according to the same method as that of Example 10 except that a molar ratio Ti:Nb:W was set to 1.0:2.1:0.4 when starting materials were mixed to obtain a mixed solution.

The molar percentage of each of constituent elements per unit weight for the active material of Comparative Example 10 was calculated by the same method as that of Example 1. As a result, it was found that Ti=10.339 atm %, Nb=18.708 atm %, W=2.028 atm %, and O=68.925 atm %.

The active material of Comparative Example 10 was subjected to wide-angle X-ray diffraction measurement in the same manner as in Example 1. A part of peaks of the spectrum coincided with monoclinic TiNb2O7 (PDF: 01-077-1374) belonging to a space group of C2/m. However, peaks of heterophases were observed. The obtained spectrum was subjected to fitting according to the same method as that of Example 1. From the half-value width of a peak attributed to a (110) plane of the monoclinic $TiNb_2O_7$ (PDF: 01-077-1374) belonging to the space group of C2/m, the crystallite size was calculated using the Scherrer's equation as described in the above manner. As a result, it was found that the crystallite size of the active material particles contained in the active material of Comparative Example 10 was 50.9 nm.

30 SEM images of the active material of Comparative Example 10 were obtained under the same observation conditions as those of Example 1. The average aspect ratio (rounded off to two decimal places for calculation) was calculated according to the same method as that of Example 1 from these SEM images. As a result, it was found that the aspect ratio for the primary particles of the active material particles contained in the active material of Comparative Example 10 was 1.77.

Comparative Example 11

In Comparative Example 11, an active material of Comparative Example 11 was synthesized according to the same method as that of Example 10 except that a molar ratio Ti:Nb:W was set to 1.0:2.15:0.1 when starting materials were mixed to obtain a mixed solution.

The molar percentage of each of constituent elements per unit weight for the active material of Comparative Example 11 was calculated by the same method as that of Example 1. As a result, it was found that Ti=9.999 atm %, Nb=19.998 atm %, W=0.008 atm %, and O=69.994 atm %.

The active material of Comparative Example 11 was subjected to wide-angle X-ray diffraction measurement in the same manner as in Example 1. It was confirmed that all peaks of the spectrum coincided with monoclinic $TiNb_2O_7$ (PDF: 01-077-1374) belonging to a space group of C2/m, and peaks of heterophases were not observed. The obtained spectrum was subjected to fitting according to the same method as that of Example 1. From the half-value width of a peak attributed to a (110) plane of the monoclinic $TiNb_2O_7$ (PDF: 01-077-1374) belonging to the space group of C2/m, the crystallite size was calculated using the Scherrer's equation as described in the above manner. As a result, it was found that the crystallite size of the active material particles contained in the active material of Comparative Example 11 was 28.4 nm.

30 SEM images of the active material of Comparative Example 11 were obtained under the same observation conditions as those of Example 1. The average aspect ratio (rounded off to two decimal places for calculation) was calculated according to the same method as that of Example 1 from these SEM images. As a result, it was found that the aspect ratio for the primary particles of the active material particles contained in the active material of Comparative Example 11 was 1.15.

Comparative Example 12

In Comparative Example 12, an active material of Comparative Example 12 was synthesized according to the same method as that of Example 13 except that a molar ratio Ti:Nb:V was set to 1.0:2.15:0.4 when starting materials were mixed to obtain a mixed solution.

The molar percentage of each of constituent elements per unit weight for the active material of Comparative Example 12 was calculated by the same method as that of Example 1. As a result, it was found that Ti=9.798 atm %, Nb=19.596 atm %, V=2.018 atm %, and O=68.587 atm %.

The active material of Comparative Example 12 was subjected to wide-angle X-ray diffraction measurement in the same manner as in Example 1. It was confirmed that all peaks of the spectrum coincided with monoclinic $TiNb_2O_7$ (PDF: 01-077-1374) belonging to a space group of C2/m, and peaks of heterophases were not observed. The obtained spectrum was subjected to fitting according to the same method as that of Example 1. From the half-value width of a peak attributed to a (110) plane of the monoclinic $TiNb_2O_7$ (PDF: 01-077-1374) belonging to the space group of C2/m, the crystallite size was calculated using the Scherrer's equation as described in the above manner. As a result, it was found that the crystallite size of the active material particles contained in the active material of Comparative Example 12 was 56.8 nm.

30 SEM images of the active material of Comparative Example 12 were obtained under the same observation conditions as those of Example 1. The average aspect ratio (rounded off to two decimal places for calculation) was calculated according to the same method as that of Example 1 from these SEM images. As a result, it was found that the aspect ratio for the primary particles of the active material particles contained in the active material of Comparative Example 12 was 1.82.

Comparative Example 13

In Comparative Example 13, an active material of Comparative Example 13 was synthesized according to the same method as that of Example 13 except that a molar ratio Ti:Nb:V was set to 1.0:2.15:0.03 when starting materials were mixed to obtain a mixed solution.

The molar percentage of each of constituent elements per unit weight for the active material of Comparative Example 13 was calculated by the same method as that of Example 1. As a result, it was found that Ti=10.0 atm, Nb=20.0 atm, V=0.003 atm %, and O=69.997 atm %.

The active material of Comparative Example 13 was subjected to wide-angle X-ray diffraction measurement in the same manner as in Example 1. It was confirmed that all peaks of the spectrum coincided with monoclinic $TiNb_2O_7$ (PDF: 01-077-1374) belonging to a space group of C2/m, and peaks of heterophase were not observed. The obtained spectrum was subjected to fitting according to the same method as that of Example 1. From the half-value width of a peak attributed to a (110) plane of the monoclinic $TiNb_2O_7$ (PDF: 01-077-1374) belonging to the space group of C2/m, the crystallite size was calculated using the Scherrer's equation as described in the above manner. As a result, it was found that the crystallite size of the active material particles contained in the active material of Comparative Example 13 was 28.9 nm.

30 SEM images of the active material of Comparative Example 13 were obtained under the same observation conditions as those of Example 1. The average aspect ratio (rounded off to two decimal places for calculation) was calculated according to the same method as that of Example 1 from these SEM images. As a result, it was found that the aspect ratio for primary particles of the active material particles contained in the active material of Comparative Example 13 was 1.11.

Comparative Example 14

In Comparative Example 14, an active material of Comparative Example 14 was synthesized according to the same method as that of Example 1 except that a solution of molybdenum chloride in ethanol was not used as a starting material, and a molar ratio Ti:Nb was set to 1.0:2.15 when starting materials were mixed.

The molar percentage of each of constituent elements per unit weight for the active material of Comparative Example 14 was calculated by the same method as that of Example 1. As a result, it was found that Ti=10.0 atm %, Nb=20.0 atm %, and O=70.0 atm %.

The active material of Comparative Example 14 was subjected to wide-angle X-ray diffraction measurement in the same manner as in Example 1. It was confirmed that all peaks of the spectrum coincided with monoclinic $TiNb_2O_7$ (PDF: 01-077-1374) belonging to a space group of C2/m, and peaks of heterophases were not observed. The obtained spectrum was subjected to fitting according to the same method as that of Example 1. From the half-value width of a peak attributed to a (110) plane of the monoclinic $TiNb_2O_7$ (PDF: 01-077-1374) belonging to the space group of C2/m, the crystallite size was calculated using the Scherrer's equation as described in the above manner. As a result, it was found that the crystallite size of the active material particles contained in the active material of Comparative Example 14 was 20.1 nm.

30 SEM images of the active material of Comparative Example 14 were obtained under the same observation conditions as those of Example 1. The average aspect ratio (rounded off to two decimal places for calculation) was calculated according to the same method as that of Example 1 from these SEM images. As a result, it was found that the aspect ratio for primary particles of the active material particles contained in the active material of Comparative Example 14 was 1.21.

[Production of Test Battery]

Test batteries of Examples 1 to 15 and Comparative Examples 1 to 14 were produced according to the following procedure using the active materials synthesized as described above. Hereinafter, the production procedure of the test battery of Example 1 will be described as an example. However, other test batteries also were produced in the same procedure.

<Production of Negative Electrode>

100% by mass of an active material of Example 1, 10% by mass of acetylene black and 10% by mass of a carbon nanofiber as a conductive agent, and 10% by mass of polyvinylidene fluoride (PVdF) as a binder were added into N-methylpyrrolidone (NMP) as a dispersing solvent, and these were mixed to prepare a slurry. The slurry was applied to each surface of a current collector including an aluminum foil having a 12 µm of thickness, to form a coated film. In this case, the slurry was not applied to a part of the current collector. Next, the coated film was dried, and then pressed. Thus, an electrode of Example 1 was produced. The electrode had an electrode-weight per unit area of 60±2 g/m$^2$ (including no current collector). A negative electrode of Example 1 included a negative electrode current collector and a negative electrode layer supported thereon. The negative electrode current collector included a negative electrode tab having a surface on which a negative electrode layer was not supported.

<Production of Positive Electrode>

100% by mass of $LiNi_{0.5}Co_{0.2}Mn_{0.3}O_2$ powder as a positive electrode active material, 10% by mass of acetylene and 10% by mass of a carbon nano fiber black as a conductive agent, and 10% by mass of polyvinylidene fluoride (PVdF) as a binder were added into N-methylpyrrolidone (NMP), and these were mixed to prepare a slurry. The slurry was applied to each of both surfaces of a current collector including an aluminum foil having a 12 µm of thickness, to form a coated film. In this case, the slurry was not applied to a part of the current collector. Next, the coated film was dried, and then pressed. Thus, a positive electrode was produced. The positive electrode had an electrode-weight per unit area (g/m$^2$) (including no current collector) adjusted so that a ratio of a positive electrode charge capacity A (mAh/g) to a negative electrode charge capacity B (mAh/g) was set to A/B=1.0±0.05. The produced positive electrode included a positive electrode current collector and a positive electrode layer supported thereon. The positive electrode current collector included a positive electrode tab having a surface on which a positive electrode layer was not supported.

<Production of Electrode Group>

An electrode group shown in FIG. 13 was produced in the following procedure using the negative electrodes and the positive electrodes, each of which is produced as described above. The electrode group shown in FIG. 13 is a part of the electrode group of the test battery of Example 1.

First, a belt-like cellulose separator 4 was provided. The separator 4 was zigzag-folded as shown in FIG. 13. Next, one of the negative electrodes 3 was laminated on the uppermost layer of the zigzag-folded separator 4. Then, the positive electrodes 5 and the negative electrodes 3 are alternately inserted into spaces formed by zigzag-folding the separator 4. Herein, the positive electrode tab 5c of the positive electrode current collector 5a and the negative electrode tab 3c of the negative electrode current collector 3a were projected out in the same direction from the separator 4. As shown in FIG. 13, in the laminating direction of the negative electrodes 3, separator 4, and positive electrodes 5, the positive electrode tabs 5c overlapped to each other, and the negative electrode tabs 3c overlapped to each other. The positive electrode tab 5c and the negative electrode tab 3c did not overlap.

Next, the plurality of overlapping negative electrode tabs 3c were welded, and connected to a negative electrode terminal. Similarly, the plurality of overlapping positive electrode tabs 5c were welded, and connected to a positive electrode terminal.

<Preparation of Nonaqueous Electrolyte>

$LiPF_6$ was dissolved at a concentration of 1 M in a mixed solvent in which the volume percent of propylene carbonate: diethyl carbonate was 1:2. Thus, a nonaqueous electrolyte was prepared.

<Production of Battery>

The electrode group 2 obtained in the above manner was housed in an container member of a laminate film. In this case, the negative electrode terminal and the positive electrode terminal were extended to the outside of the container member. Next, the circumference of the laminate film was welded except a part. Next, the nonaqueous electrolyte prepared in the above manner was injected into the container member via an unwelded part (injection hole) of the laminate film. Next, the injection hole was welded to produce a nonaqueous electrolyte battery of Example 1 having a capacity of 1.0 Ah.

[Test]

Each of the batteries produced as described above was subjected to a rate test and a cycle test in the following procedure.

(Rate Test)

First, each of the batteries was subjected to a constant-current charge at a rate of 1 C until a battery voltage reached to 3.0 V, and then subjected to a charge at a constant voltage of 3.0 V until a current value became 0.05 C. Next, the battery was subjected to a discharge at a rate of 0.2 C until the battery voltage reached 1.5 V. The discharge amount obtained by the discharge was recorded as a 0.2 C discharge amount.

Next, each of the batteries was subjected to a constant-current charge at a rate of 1 C until the battery voltage reached 3.0 V, and then subjected to a charge at a constant voltage of 3.0 V until the current value became 0.05 C. Next, the battery was subjected to a discharge at a rate of 5 C until the battery voltage reached 1.5 V. The discharge amount obtained by the discharge was recorded as a 5 C discharge amount.

The ratio of the 5 C discharge amount to the 0.2 C discharge amount for each of the batteries was calculated as a 5 C/0.2 C capacity ratio as a barometer of rate characteristics.

(Cycle Test)

After the rate test, each of the batteries was subjected to the cycle test in the following procedure. First, each of the batteries was subjected to a constant-current charge at a rate of 1 C until the battery voltage reached 3.0 V, and then subjected to a charge at a constant voltage of 3.0 V until a current value became 0.05 C. Next, the battery was allowed to stand at 25° C. in a thermostatic bath. Next, the battery was subjected to a discharge at a rate of 5 C until the battery voltage reached 1.5 V. The above set of the charge, the still standing and the discharge was defined as one cycle. The battery was allowed to stand for 10 minutes between the cycles. In the cycle test, the above cycle was carried out 1000 times. The cycle test was carried out under fixed conditions at a temperature of 25° C.

The ratio of the discharge amount which could be discharged by the discharge at the 1000th cycle to the discharge amount which could be discharged by the discharge at the first cycle was calculated as a cycle capacity retention ratio as an barometer of cycle life characteristics.

[Results]

First, the synthesis conditions of the active materials in Examples and Comparative Examples are summarized in the following Table 1.

TABLE 1

| | Additive Element | Amount of Additive Element (atm %) | Firing Temperature | Temperature Rising Rate | Firing Time | Synthesis Method |
|---|---|---|---|---|---|---|
| Example 1 | Mo | 0.012 | 900° C. | 30° C./min | 30 minutes | Liquid Phase Method |
| Example 2 | Mo | 0.26 | 900° C. | 30° C./min | 30 minutes | Liquid Phase Method |
| Example 3 | Mo | 1.113 | 900° C. | 30° C./min | 30 minutes | Liquid Phase Method |
| Example 4 | Mo | 1.941 | 900° C. | 30° C./min | 30 minutes | Liquid Phase Method |
| Example 5 | Mo | 0.26 | 800° C. | 30° C./min | 30 minutes | Liquid Phase Method |
| Example 6 | Mo | 0.26 | 700° C. | 30° C./min | 30 minutes | Liquid Phase Method |
| Example 7 | Mo | 0.26 | 900° C. | 40° C./min | 30 minutes | Liquid Phase Method |
| Example 8 | Mo | 0.26 | 900° C. | 25° C./min | 30 minutes | Liquid Phase Method |
| Example 9 | Mo | 0.26 | 900° C. | 20° C./min | 30 minutes | Liquid Phase Method |
| Example 10 | W | 0.011 | 900° C. | 30° C./min | 30 minutes | Liquid Phase Method |
| Example 11 | W | 0.47 | 900° C. | 30° C./min | 30 minutes | Liquid Phase Method |
| Example 12 | W | 1.796 | 900° C. | 30° C./min | 30 minutes | Liquid Phase Method |
| Example 13 | V | 0.013 | 900° C. | 30° C./min | 30 minutes | Liquid Phase Method |
| Example 14 | V | 0.6 | 900° C. | 30° C./min | 30 minutes | Liquid Phase Method |
| Example 15 | V | 1.922 | 900° C. | 30° C./min | 30 minutes | Liquid Phase Method |
| Comparative Example 1 | Mo | 0.52 | 1000° C. | 5° C./min | 12 hours | Solid Phase Method |
| Comparative Example 2 | W | 0.49 | 1000° C. | 5° C./min | 12 hours | Solid Phase Method |
| Comparative Example 3 | V | 0.51 | 1000° C. | 5° C./min | 12 hours | Solid Phase Method |
| Comparative Example 4 | Mo | 0.25 | 1000° C. | 20° C./min | 30 minutes | Liquid Phase Method |
| Comparative Example 5 | Mo | 0.26 | 600° C. | 20° C./min | 30 minutes | Liquid Phase Method |
| Comparative Example 6 | Mo | 0.26 | 900° C. | 5° C./min | 30 minutes | Liquid Phase Method |
| Comparative Example 7 | Mo | 0.26 | 1000° C. | 5° C./min | 30 minutes | Liquid Phase Method |
| Comparative Example 8 | Mo | 2.144 | 900° C. | 20° C./min | 30 minutes | Liquid Phase Method |
| Comparative Example 9 | Mo | 0.006 | 900° C. | 20° C./min | 30 minutes | Liquid Phase Method |
| Comparative Example 10 | W | 2.028 | 900° C. | 20° C./min | 30 minutes | Liquid Phase Method |
| Comparative Example 11 | W | 0.008 | 900° C. | 20° C./min | 30 minutes | Liquid Phase Method |
| Comparative Example 12 | V | 2.018 | 900° C. | 20° C./min | 30 minutes | Liquid Phase Method |
| Comparative Example 13 | V | 0.003 | 900° C. | 20° C./min | 30 minutes | Liquid Phase Method |
| Comparative Example 14 | — | 0 | 900° C. | 20° C./min | 30 minutes | Liquid Phase Method |

Next, the crystallite size and the aspect ratio for the primary particles of the active material particles contained in the active material of each of Examples and Comparative Examples, and the 5 C/0.2 C capacity ratio and cycle capacity retention ratio of the test battery of each of Examples and Comparative Examples are summarized in the following Table 2.

TABLE 2

| | Crystallite Size (nm) | Aspect Ratio | 5 C/0.2 C Discharge Capacity Ratio (%) | Cycle Capacity Retention Ratio (%) |
|---|---|---|---|---|
| Example 1 | 30.1 | 1.52 | 91.7 | 80.2 |
| Example 2 | 32.1 | 1.55 | 93.5 | 84.1 |

TABLE 2-continued

| | Crystallite Size (nm) | Aspect Ratio | 5 C/0.2 C Discharge Capacity Ratio (%) | Cycle Capacity Retention Ratio (%) |
|---|---|---|---|---|
| Example 3 | 38.9 | 1.63 | 90.9 | 78.3 |
| Example 4 | 42.3 | 1.71 | 88.6 | 75.7 |
| Example 5 | 20.6 | 1.42 | 94.1 | 83.4 |
| Example 6 | 10.1 | 1.21 | 87.9 | 76.9 |
| Example 7 | 30.2 | 1.21 | 94.6 | 83.8 |
| Example 8 | 32.6 | 2.65 | 86.4 | 75.1 |
| Example 9 | 29.5 | 3.82 | 78.3 | 73.6 |
| Example 10 | 29.5 | 1.58 | 90.5 | 80.6 |
| Example 11 | 31.9 | 1.62 | 93.2 | 84.3 |
| Example 12 | 34.7 | 1.83 | 88.9 | 75.7 |
| Example 13 | 31.6 | 1.32 | 91.4 | 80.4 |
| Example 14 | 33.3 | 1.44 | 93.6 | 83.7 |
| Example 15 | 43.1 | 1.59 | 89.1 | 75.5 |
| Comparative Example 1 | 85.3 | 4.5 | 73.2 | 65.1 |
| Comparative Example 2 | 90.5 | 4.23 | 71.4 | 64.2 |
| Comparative Example 3 | 88.9 | 4.81 | 71.8 | 60.6 |
| Comparative Example 4 | 92.1 | 3.84 | 74.4 | 69.7 |
| Comparative Example 5 | 4.84 | 1.12 | 72.1 | 58.8 |
| Comparative Example 6 | 56.1 | 4.21 | 76.1 | 73.2 |
| Comparative Example 7 | 85.4 | 4.88 | 73.5 | 68 |
| Comparative Example 8 | 51.5 | 1.96 | 81.2 | 69.7 |
| Comparative Example 9 | 29.9 | 1.21 | 75.9 | 71.4 |
| Comparative Example 10 | 50.9 | 1.77 | 81.1 | 69.6 |
| Comparative Example 11 | 28.4 | 1.15 | 75.3 | 70.7 |
| Comparative Example 12 | 56.8 | 1.82 | 81.3 | 68.7 |
| Comparative Example 13 | 28.9 | 1.11 | 75.5 | 70.3 |
| Comparative Example 14 | 20.1 | 1.21 | 75.6 | 70.3 |

DISCUSSION

First, in all of Examples 1 to 18, the active material was synthesized by liquid-phase synthesis. Meanwhile, in Comparative Examples 1 to 3, the active material was synthesized by solid-phase synthesis. Prolonged firing was required in the solid-phase synthesis of Comparative Examples 1 to 3. Therefore, the active material particles of each of Comparative Examples 1 to 3 had a large crystallite size and a large aspect ratio for a primary particle, as is clear from Table 1. In fact, as is clear from the typical SEM image for the active material of Comparative Example 1 shown in FIG. 12, the active material of Comparative Example 1 contained active material particles having a large aspect ratio having an attached scale. Meanwhile, in Examples 1 to 18, a temperature-rising rate during firing was set to 20° C./min or more. Synthesis according to a liquid phase method could suppress increases in the crystallite size and the aspect ratio for the primary particle even if a compound containing at least one element selected from the group consisting of Mo, V, and W was used as a sintering agent. For this reason, the test batteries of Examples 1 to 18 could suppress an increase in the diffusion length of Li in the active material in the negative electrode. As a result, the 5 C/0.2 C capacity ratio and the cycle capacity retention ratio of Example 1 to 18 were higher than those of Comparative Examples 1 to 3.

In Examples 1 to 4 and Comparative Examples 8 and 9, Mo is used as the additive element, and the content of the additive element in the niobium-titanium composite oxide is changed. From the results shown in Table 2, it is found that the test batteries of Examples 1 to 4 in which the content of Mo in the niobium-titanium composite oxide is within a range of 0.01 atom % or more and 2 atom % or less have a higher 5 C/0.2 C capacity ratio and cycle capacity retention ratio than those of the test battery of Comparative Example 8 in which the content of Mo is excessively large and the test battery of Comparative Example 9 in which the content of Mo is excessively small. This result is provided because in each of Examples 1 to 4, though the compound containing Mo was used as the sintering agent during firing to synthesize the niobium-titanium composite oxide in which a part of Nb and/or Ti are substituted by a Mo element, the increases in the crystallite size and the aspect ratio for a primary particle can be suppressed, as shown in Table 2.

Meanwhile, in the active material of Comparative Example 8, the content of Mo in the niobium-titanium composite oxide exceeds 2.00 atm %. This is considered to exceed the solubility limit of Mo in the niobium-titanium composite oxide. Therefore, the active material particles of the niobium-titanium composite oxide contained in the active material of Comparative Example 8 were in a state where a number of heterophases remained in the active material. This is supported also from the wide-angle X-ray diffraction measurement result for the active material of Comparative Example 8. It is considered that, in the active material of Comparative Example 8 containing the active material particles thus containing the heterophases, cracks of the active material are caused by stress accompanied by volume expansion and contraction during insertion and extraction of Li, which causes a deterioration in cycle characteristics.

It is considered that, in the active material of Comparative Example 9, the content of Mo in the niobium-titanium composite oxide is less than 0.01 atm %, and the abundance of Mo as the sintering agent is small. Therefore, it is considered that, in the active material of Comparative Example 9, densification does not sufficiently progress during firing, which can provide no phase having sufficient crystallinity. Because of that, it is considered that the test battery of Comparative Example 9 exhibited poor rate characteristics and cycle life characteristics.

From the results of Examples 10 to 12 and Comparative Examples 10 and 11, it is found that the cases where W is used as the additive element also have the same tendency as that of Mo. From the results of Examples 13 to 15 and Comparative Examples 12 and 13, it is found that the cases where V is used as the additive element also has the same tendency as that of Mo.

The active material of Comparative Example 14 is synthesized without adding Mo, W, and V into the starting materials. Because the active material of Comparative Example 14 was synthesized without using materials serving as the sintering agent, the active material had low crystallinity in spite of a low firing temperature of 900° C. For this reason, it is considered that the diffusion of bulk Li is inhibited in the active material of Comparative Example 14, and the test battery of Comparative Example 14 has a lower 5 C/0.2 C capacity ratio and cycle capacity retention ratio than those of the test battery of Example 1.

In Examples 5 and 6 and Comparative Examples 4 and 5, the firing temperature was changed from Example 1. In Examples 5 and 6, the starting materials contained a compound containing Mo, and the compound functioned as the sintering agent. Therefore, although the active materials of Examples 5 and 6 were synthesized in a state where the firing temperature was lowered to 800° C. and 700° C., the 5 C/0.2 C capacity ratio and cycle capacity retention ratio of the test batteries of Examples 5 and 6 were not decreased compared with those of Example 1. Meanwhile, it is considered that, in Comparative Example 4 in which the firing temperature exceeds 1000° C., the crystallite size of the obtained active material particles is excessively increased, which causes an increase in the diffusion length of Li in the active material particles, as a result of which the rate characteristics of the test battery of Comparative Example 4 are decreased. Meanwhile, it is considered that the firing temperature of the active material of Comparative Example 5 is too low, which causes a too small crystallite size of the obtained active material particles. It is considered that, in the active material of Comparative Example 5, the crystallite size of the active material particles is too small, which causes a unstable Li insertion site because of the influence of the active material interface, and an increase in a side reaction. From these, it is considered that the test battery of Comparative Example 5 exhibited poor cycle characteristics.

In Examples 7 to 9 and Comparative Examples 6 and 7, the temperature-rising rate was changed from Example 1. Because the temperature-rising rate during firing in the synthesis of each of the active materials of Comparative Examples 6 and 7 was too low, the aspect ratio for a primary particle of the obtained active material particles exceeded 4. Therefore, it is considered that, in each of the test batteries of Comparative Examples 6 and 7, the diffusion length of Li in the active material in the negative electrode is increased. As a result, it is considered that the test batteries of Comparative Examples 6 and 7 exhibited poor cycle characteristics.

According to at least one embodiment and Examples described above, an active material for a battery is provided. The active material for a battery contains active material particles made of a monoclinic niobium-titanium composite oxide. The monoclinic niobium-titanium composite oxide contains at least one element selected from the group consisting of Mo, V, and W. The content of at least one element selected from the group consisting of Mo, V, and W in the monoclinic niobium-titanium composite oxide is within a range of 0.01 atm % or more and 2 atm % or less. Each of the active material primary particles has an aspect ratio within a range of 1 or more and less than 4. Each of the active material particles has a crystallite size in a range of 5 nm or more and 90 nm or less. Because an increase in a Li diffusion length in solid in the active material particles during crystal growth has been suppressed in the active material for a battery, the occurrence of an overvoltage and a side reaction on a reduction side during charging can be suppressed when the active material for a battery is used in a state where it is incorporated in a nonaqueous electrolyte battery. As a result, the active material for a battery can achieve a nonaqueous electrolyte battery exhibiting excellent input-output characteristics and excellent cycle characteristics.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An active material comprising active material primary particles of a monoclinic niobium-titanium composite oxide comprising at least one element selected from the group consisting of Mo, V, and W, wherein:
    a content of the at least one element in the monoclinic niobium-titanium composite oxide is within a range of 0.01 atm % or more and 2 atm % or less; and
    each of the active material primary particles has an aspect ratio within a range of 1 or more and less than 4 and a crystallite size within a range of 5 nm or more and 90 nm or less.

2. The active material according to claim 1, wherein each of the active material primary particles has the aspect ratio within a range of 1 or more and 3 or less.

3. The active material according to claim 1, wherein each of the active material primary particles has a crystallite size within a range of 10 nm or more and 70 nm or less.

4. The active material according to claim 1, wherein the content of the at least one element in the monoclinic niobium-titanium composite oxide is within a range of 0.01 atm % or more and 0.3 atm % or less.

5. The active material according to claim 1, wherein the monoclinic niobium-titanium composite oxide further comprises at least one element selected from the group consisting of Ta, Fe, Bi, Sb, As, P, Cr, B, Na, Mg, Al, and Si.

6. The active material according to claim 1, wherein the monoclinic niobium-titanium composite oxide is represented by the general formula of $Ti_{1-a-c}M1_aM3_cNb_{2-b-d}M2_bM4_dO_7$:
    wherein:
    $0 \leq a < 1$, $0 \leq b < 1$, and $0 < c+d < 1$;
    M1 and M2 are at least one element selected from the group consisting of Nb, Ta, Fe, Ti, Bi, Sb, As, P, Cr, B, Na, Mg, Al, and Si, and M1 and M2 may be the same or different from each other; and
    M3 and M4 are at least one element selected from V, Mo, and W, and M3 and M4 may be the same or different from each other.

7. The active material according to claim 1, further comprising a carbon-containing layer which covers at least a part of surfaces of the active material primary particles.

8. The active material according to claim 1, which comprises secondary particles formed by an aggregation of the active material primary particles.

9. The active material according to claim 1, which comprises secondary particles of the monoclinic niobium-titanium composite oxide.

10. A nonaqueous electrolyte battery comprising:
    a negative electrode containing the active material according to claim 1;
    a positive electrode; and
    a nonaqueous electrolyte.

11. A battery pack comprising the nonaqueous electrolyte battery according to claim 10.

12. A battery module comprising nonaqueous electrolyte batteries, each of which comprises
    a negative electrode comprising the active material according to claim 1;
    a positive electrode; and
    a nonaqueous electrolyte,
    wherein the nonaqueous electrolyte batteries are electrically connected in series and/or in parallel.

13. A battery pack comprising the battery module according to claim 12.

* * * * *